US007941520B1

(12) United States Patent
Kite et al.

(10) Patent No.: US 7,941,520 A0
(45) Date of Patent: May 10, 2011

(54) SYSTEM AND METHOD FOR TRACKING TELEPHONE NETWORK CAPACITY AND EQUIPMENT

(75) Inventors: Joshua W. Kite, Atlanta, GA (US); Ellen W. Brown, Pensacola, FL (US); Patricia Rankins Askew, Huntersville, NC (US); Rick Quinn, Davie, FL (US); Mark K. Zickefoose, Orlando, FL (US); James P. Womack, Grand Coteau, LA (US); Greg Cowart, Woodstock, GA (US); William L. Pfister, Winchester, KY (US); Ted J. Carlson, Nashville, TN (US); Gary P. Ray, Trussville, AL (US); Joseph V. Lillie, Lafayette, LA (US); Lawrence C. Bratton, Monroe, LA (US); Carolyn F. Champion, Snellville, GA (US); John Kenneth Breard, Monroe, LA (US); Robert E. Dabney, Irmo, SC (US); Lynn Bainbridge Horton, Cumming, GA (US); Greg Lake, Kennesaw, GA (US); Watson Dorn, Jr., Lilburn, GA (US); Elias Rodriguez, Snellville, GA (US); Russell T. Smith, Snellville, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 2480 days.

(21) Appl. No.: 09/964,451

(22) Filed: Sep. 28, 2001

(51) Int. Cl.
*G06F 15/173* (2006.01)
(52) U.S. Cl. ........ 709/224; 709/217; 709/218; 709/219; 709/223; 379/247; 707/1; 707/2; 707/104.1; 715/736

(58) Field of Classification Search .................. 379/247; 709/217–219, 223, 224; 707/1, 2, 104.1; 715/736
See application file for complete search history.

(56) References Cited

U.S. PATENT DOCUMENTS

| 5,416,833 | A | * | 5/1995 | Harper et al. ............. 379/201.05 |
| 5,491,742 | A | * | 2/1996 | Harper et al. ............. 379/201.12 |
| 5,500,934 | A | * | 3/1996 | Austin et al. .................. 715/853 |
| 5,559,955 | A | * | 9/1996 | Dev et al. ............................ 714/4 |
| 5,644,619 | A | * | 7/1997 | Farris et al. ................. 379/29.01 |
| 5,687,212 | A | * | 11/1997 | Kinser et al. .................. 379/9.03 |
| 5,774,689 | A | * | 6/1998 | Curtis et al. ..................... 703/21 |
| 5,790,633 | A | * | 8/1998 | Kinser et al. .................. 379/9.02 |
| 5,790,634 | A | * | 8/1998 | Kinser et al. ................. 379/29.01 |
| 5,881,131 | A | * | 3/1999 | Farris et al. ................. 379/15.03 |
| 5,910,803 | A | * | 6/1999 | Grau et al. ..................... 715/734 |

(Continued)

OTHER PUBLICATIONS

Crawford, Sharon. Windows 2000 Pro: The Missing Manual. Nov. 2000. O'Reilly. First Edition.*

*Primary Examiner* — Saleh Najjar
*Assistant Examiner* — Alicia Baturay
(74) *Attorney, Agent, or Firm* — Withers & Keys, LLC

(57) ABSTRACT

A system and method of managing telephone network facilities. A telephone network facilities database, such as LEIS, is accessed and selected information, including wire center location, equipment and slot information stored therein, is extracted and re-stored in a relational database. Additional fields in the relational database are populated based on the information extracted from the telephone network facilities database. The additional fields represent working ADSL and T1 facilities, ADSL and T1 capacity, and ADSL and T1 availability. A graphical user interface is provided that displays several views of the data in the relational database. Color coding aspects of the graphical user interface indicates capacity levels.

29 Claims, 40 Drawing Sheets

U.S. PATENT DOCUMENTS

| | | | |
|---|---|---|---|
| 5,953,347 A * | 9/1999 | Wong et al. | 370/469 |
| 5,953,389 A * | 9/1999 | Pruett et al. | 379/9 |
| 6,031,528 A * | 2/2000 | Langfahl, Jr. | 715/734 |
| 6,040,834 A * | 3/2000 | Jain et al. | 715/853 |
| 6,292,801 B1 * | 9/2001 | Campbell et al. | 707/10 |
| 6,295,540 B1 * | 9/2001 | Sanschagrin et al. | 707/201 |
| 6,504,924 B2 * | 1/2003 | Rojas | 379/229 |
| 6,615,258 B1 * | 9/2003 | Barry et al. | 709/223 |
| 6,687,335 B1 * | 2/2004 | Jones et al. | 379/1.01 |
| 6,701,345 B1 * | 3/2004 | Carley et al. | 709/205 |
| 6,714,217 B2 * | 3/2004 | Huang et al. | 715/736 |
| 6,721,750 B1 * | 4/2004 | Jones et al. | 707/100 |
| 6,810,415 B2 * | 10/2004 | Allen et al. | 709/219 |
| 6,845,148 B1 * | 1/2005 | Beamon | 379/9.02 |
| 6,862,351 B2 * | 3/2005 | Taylor | 379/221.06 |
| 6,900,822 B2 * | 5/2005 | Germain et al. | 715/736 |
| 7,146,568 B2 * | 12/2006 | Richardson | 715/736 |
| 2005/0114497 A1 * | 5/2005 | Mani et al. | 709/224 |

* cited by examiner

CONNECTION

| LEIS Fieldname | LEIS Type | LEIS Length | Description |
| --- | --- | --- | --- |
| Cable | C | 10 | Copper or fiber cable name (or other identifier) |
| Pair | Integer | 4 | Copper or fiber pair name |
| Purpose | C | 5 | |
| Type | C | 1 | Type of pair – either copper or fiber |
| Fromequip | C | 20 | Equipment id of the "from" equipment |
| Fromshelf | C | 4 | Character id to identify a shelf |
| Fromslotlo | Integer | 4 | Slot ID that the low pair is connected to for the "from" equipment |
| Fromslothi | Integer | 4 | Slot ID that the high pair is connected to for the "from" equipment |
| Toequip | C | 20 | Equipment ID of the "to" equipment |
| Toshelf | C | 4 | Character id to identify a shelf |
| Toslotlo | Integer | 4 | Slot ID that the low pair is connected to for the "to" equipment |
| Toslothi | Integer | 4 | Slot ID that the high pair is connected to for the "to" equipment |
| Length | Integer | 4 | Cable length in feet |
| Designloss | Float | 4 | Design loss in dB |
| Bandwidth | Integer | 4 | Bandwidth for fiber in MHz |
| Pule | Integer | 4 | Pulse dispersion in ps (picoseconds) |
| Wavelen | Integer | 4 | Wave length |
| Measloss | Float | 4 | The actual measured loss in dB for the transmission facility |
| Resistance | Integer | 4 | Resistance in Ohms |
| Nom1 | C | 20 | Sheath code |
| Nom2 | C | 20 | Fiber transmission code |
| Connid | Integer | 4 | Program created attribute that uniquely identifies a connection |
| Wctrclli | N/a | 10 | An appended field identifying the wirecenter for each record |

Figure 4

EQUIPMENT

| LEIS Fieldname | LEIS Type | LEIS Length | Description |
|---|---|---|---|
| Equipid | C | 20 | Equipment identification; must be unique for a wirecenter |
| Locid | C | 20 | An OSP location id |
| Category | C | 5 | |
| Bay | C | 10 | A relay identification where building, floor, and aisle are identified |
| Bayunit | Integer | 4 | A subdivision of a bay |
| Productid | C | 14 | An ID that includes vendor and model information |
| Generic | C | 5 | Software generic associated with piece of equipment |
| Account | C | 4 | Accounting Code |
| Voltage | C | 5 | Operating voltage required |
| Lobitrate | Float | 4 | A low bit rate value |
| Hibitrate | Float | 4 | A high bit rate value |
| Teo | C | 10 | Telephone equipment order number associated with a piece of equipment |
| Status | C | 1 | See Note 2 |
| Instl_date | Date | 0 | Actual or estimated completion date for electronic equipment placement |
| Mode | C | 4 | Operating mode or equipment configuration |
| Remarks | C | 50 | Remarks about this equipment. |
| Filter | C | 6 | A fault locate filter code; SCID for SONET devices |
| Clei | C | 10 | COMMON LANGUAGE™ Equipment Identification for equipment |
| Ewo | C | 10 | Engineering Work Order. A project number, pending routine, or estimate authorization number |
| Equip_rte | C | 9 | Equipment feeder route designation |
| Eq_settings | C | 50 | A setting for a network interface |
| Wctrclli | N/a | 10 | An appended field identifying the wirecenter for each record |

Figure 5

I_SYSCONN

| LEIS Fieldname | LEIS Type | LEIS Length | Description |
|---|---|---|---|
| Connid | Integer | 4 | Program created attribute that uniquely identifies a connection |
| Sysid | C | 20 | FACS system type + '#' + FACS system number; used to uniquely identify each system |
| Wctrclli | N/a | 10 | An appended field identifying the wirecenter for each record |

Figure 6

LOCATION

| LEIS Fieldname | LEIS Type | LEIS Length | Description |
|---|---|---|---|
| Locid | C | 20 | An OSP location id that must be unique for the wirecenter |
| Clli | C | 11 | COMMON LANGUAGE™ Location Identification (CLLI™) code |
| Address | C | 50 | A street address for the location; SAG Valid; RLA Address in FACS |
| Enclosure | C | 20 | Building, hut, minihut, maxihut, cev, community service cabinet - vendor and module could be included |
| Csa | C | 8 | Carrier serving area or feeder section number |
| Plat | C | 8 | Outside Plant Layout Record reference |
| Geocode | C | 8 | Area number or geographic location code |
| Taxcode | C | 6 | Tax code of location |
| Telnumber | C | 10 | Telephone number assigned to a given location |
| Power | Float | 4 | Powering required at a location (kilowatts) |
| Powerout | C | 5 | Type of external power outlet at a location for providing backup power (amps) |
| Remarks | C | 50 | Remarks about a location; location alarm wiring figure (AWF) |
| Ship_address | C | 30 | Address of garage, warehouse, etc. to which ordered plugs should be shipped |
| Ship_city_st | C | 20 | City, state and zip of address to which ordered plugs should be shipped |
| Loc_rte | C | 9 | The route served by a piece of equipment (or 'co' if localized to the central office) |
| Status | C | 1 | Status of the structure / enclosure |
| Struc_date | Date | 0 | Placement of structure / closure |
| Inven_date | Date | 0 | Date plugs were last inventoried |
| da | C | 8 | Distribution area number; RLA taper code |
| Wctrclli | N/a | 10 | An appended field identifying the wirecenter for each record |

Figure 7

LOOP

| LEIS Fieldname | LEIS Type | LEIS Length | Description |
|---|---|---|---|
| Loopid | C | 8 | Automated ID for each Loop |
| Loop | C | 60 | LFACS CircuitID associated with the cable and pair |
| Term | C | 50 | The facility terminal name |
| Status | C | 3 | Cable and pair status |
| Fn_ca | C | 10 | Copper or fiber cable name (or other identifier) |
| Fn_pr | C | 8 | Copper or fiber pair name |
| Wctrclli | N/a | 10 | An appended field identifying the wirecenter for each record |

Figure 8

PAIR

| LEIS Fieldname | LEIS Type | LEIS Length | Description |
|---|---|---|---|
| Ca | C | 50 | Copper or fiber cable name (or other identifier) |
| Pr | Integer | 8 | Copper or fiber pair name |
| Loopid | C | 8 | Corresponding Loopid for every cable and pair |
| Pe | C | 3 | Status of the pair |
| Wctrclli | N/a | 10 | An appended field identifying the wirecenter for each record |

Figure 9

SLOT

| LEIS Fieldname | LEIS Type | LEIS Length | Description |
|---|---|---|---|
| Equipid | C | 20 | Equipment identification; must be unique for a wirecenter |
| Shelf | C | 4 | Character id to identify a shelf |
| Slot | Integer | 4 | A number denoting the slot in which plugs are placed; add '900' at the common slot numbers to make them unique |
| Card | C | 10 | A generic plug-in identification from the vendor |
| Function | C | 5 | Line terminal status or common plug-in function |
| Ewo | C | 10 | A project number or pending EWO number |
| Status | C | 1 | |
| Clei | C | 10 | COMMON LANGUAGE™ Equipment Identification for plug-ins |
| Settings | C | 20 | Transmission settings associated with a plug-in; required for the equip.set report for the DDM2000 and FLM-150 |
| Resistance | Integer | 4 | Resistance for the plug-in, in ohms |
| Rate | Float | 8 | A value that stores the low bit rate associated with a plug-in |
| Max_lines | Integer | 4 | A line capacity associated with a plug-in |
| Frame_format | C | 10 | A value that represents framing formats associated with a plug-in (i.e. sf or esf) |
| Line_code | C | 10 | A value that represents line codes associated with a plug-in (i.e. ami or b8zs) |
| Error_rate | C | 10 | A value that represents the bi-polar error rate threshold associated with a plug-in |
| Super_slot | C | 4 | A slot that contains fictitious subslots |
| Wctrclli | N/a | 10 | An appended field identifying the wirecenter for each record |

Figure 10

SUPPORT_PAIR

| LEIS Fieldname | LEIS Type | LEIS Length | Description |
|---|---|---|---|
| Equipid | Integer | 20 | Equipment identification; must be unique for a wirecenter |
| Purpose | C | 5 | |
| Cable | C | 10 | Copper or fiber cable name (or other identifier) |
| Pair | Integer | 8 | Copper or fiber pair name |
| Ow_settings | C | 19 | |
| Ow_telnumber | C | 10 | |
| Pa_id | C | 6 | |
| Wctrclli | N/a | 10 | An appended field identifying the wirecenter for each record |

Figure 11

SYSTEM

| LEIS Fieldname | LEIS Type | LEIS Length | Description |
|---|---|---|---|
| Sysid | C | 20 | FACS system type + '#' + FACS system number; used to uniquely identify each system |
| Origequip | C | 20 | Originating piece of equipment for a system |
| Termequip | C | 20 | Terminating piece of equipment for a system |
| Majalarm | C | 60 | Major alarms associated with a particular system |
| Minalarm | C | 60 | Minor alarms associated with a particular system |
| Clocking | C | 60 | System clocking - internal or external |
| Protection | C | 60 | System protection for the digital lines |
| Siglead | C | 1 | Signaling leads terminated - yes or no |
| Remarks | C | 50 | Often used to denote the LMOS system type for a particular system |
| Servdate | Date | 0 | Turn up date of a system |
| Integrated | C | 1 | Yes or no depending if the terminating piece of equipment is a remote terminal |
| Tirks_act | C | 1 | "n" = no TIRKS action; 'd' = design special circuits; 'a' = assigned by TIRKS system |
| Isdn | C | 15 | 'ba' = basic access; 'pr' = primary rate; 'bb' = broadband; use if applicable |
| Length | Integer | 4 | Internally generated value calculating the total length of the spans between the originating and terminating equipment |
| Statebit | Integer | 2 | |
| Lastmodby | C | 12 | Internally generated value showing the CUID of the last person to modify the system |
| Critalarms | C | 60 | Critical alarms associated with a particular system |
| Mode | C | 10 | Mode of system |
| Wctrclli | N/a | 10 | An appended field identifying the wirecenter for each record |

Figure 12

Equipment File to TMP_EQUIPMENT

| Data Item | Description | Type | P | M |
|---|---|---|---|---|
| WC_CLLI | 8 character LEIM WC CLLI code | VARCHAR (8) | Y | Y |
| EQUIPID | | VARCHAR (20) | Y | Y |
| LOCID | | VARCHAR (20) | | |
| CATEGORY | | VARCHAR (5) | | |
| BAY | | VARCHAR (10) | | |
| BAYUNIT | | NUM (4) | | |
| PRODUCTID | | VARCHAR (14) | | |
| GENERIC | | VARCHAR (5) | | |
| ACCOUNT | | VARCHAR (4) | | |
| VOLTAGE | | VARCHAR (5) | | |
| LOBITRATE | | NUM (10,5) | | |
| HIBITRATE | | NUM (10,5) | | |
| TEO | | VARCHAR (10) | | |
| STATUS | | VARCHAR (1) | | |
| INSTL_DATE | | DATE | | |
| MODE | | VARCHAR (4) | | |
| REMARKS | | VARCHAR (50) | | |
| FILTER | | VARCHAR (6) | | |
| CLEI | | VARCHAR (10) | | |
| EWO | | VARCHAR (10) | | |
| EQUIP_RTE | | VARCHAR (9) | | |
| EQ_SETTINGS | | VARCHAR (50) | | |

Figure 17

Location File to TMP_LOCATION

| Data Item | Description | Type | P | M |
|---|---|---|---|---|
| WC_CLLI | 8 character LEIM WC CLLI code | VARCHAR(8) | Y | Y |
| LOCID | | VARCHAR (20) | Y | Y |
| CLLI | | VARCHAR (11) | | |
| ADDRESS | | VARCHAR(50) | | |
| ENCLOSURE | | VARCHAR(20) | | |
| CSA | | VARCHAR(8) | | |
| PLAT | | VARCHAR(8) | | |
| GEOCODE | | VARCHAR(8) | | |
| TAXCODE | | VARCHAR(6) | | |
| TELNUMBER | | VARCHAR(10) | | |
| POWER | | NUM(10,5) | | |
| POWEROUT | | VARCHAR(5) | | |
| REMARKS | | VARCHAR(50) | | |
| SHIP_ADDRESS | | VARCHAR(30) | | |
| SHIP_CITY_ST | | VARCHAR(20) | | |
| LOC_RTE | | VARCHAR(9) | | |
| STATUS | | VARCHAR(1) | | |
| STRUC_DATE | | DATE | | |
| INVEN_DATE | | DATE | | |
| DA | | VARCHAR(8) | | |

Figure 18

Slot File to TMP_SLOT

| Column | Description | Type | P | M |
|---|---|---|---|---|
| WC_CLLI | 8 character LEIM WC CLLI code | VARCHAR (8) | | Y |
| EQUIPID | | VARCHAR (20) | | Y |
| SHELF | | VARCHAR (4) | | |
| SLOT | | NUM(4) | | Y |
| CARD | | VARCHAR (10) | | |
| FUNCTION | | VARCHAR (5) | | |
| EWO | | VARCHAR (10) | | |
| STATUS | | VARCHAR(1) | | |
| CLEI | | VARCHAR (10) | | |
| SETTINGS | | VARCHAR (20) | | |
| RESISTANCE | | NUM(4) | | |
| RATE | | NUM(10,5) | | |
| MAX_LINES | | NUM(4) | | |
| FRAME_FORMAT | | VARCHAR (10) | | |
| LINE_CODE | | VARCHAR (10) | | |
| ERROR_RATE | | VARCHAR (10) | | |
| SUPER_SLOT | | VARCHAR (4) | | |

Index: WC_CLLI, EQUIPID, SHELF, SLOT – SHELF may be null

Figure 19

System File to TMP_SYSTEM

| Column | Description | Type | P | M |
|---|---|---|---|---|
| WC_CLLI | 8 character LEIM WC CLLI code | VARCHAR (8) | Y | Y |
| SYSID | | VARCHAR (20) | Y | Y |
| ORIGEQUIP | | VARCHAR (20) | | |
| TERMEQUIP | | VARCHAR (20) | | |
| MAJALARM | | VARCHAR (60) | | |
| MINALARM | | VARCHAR (60) | | |
| CLOCKING | | VARCHAR (60) | | |
| PROTECTION | | VARCHAR (60) | | |
| SIGLEAD | | VARCHAR(1) | | |
| REMARKS | | VARCHAR (50) | | |
| SERVDATE | | DATE | | |
| INTEGRATED | | VARCHAR(1) | | |
| TIRKS_ACT | | VARCHAR(1) | | |
| ISDN | | VARCHAR (15) | | |
| LENGTH | | NUM(4) | | |
| STATEBIT | | NUM(2) | | |
| LASTMODBY | | VARCHAR (12) | | |
| CRITALARMS | | VARCHAR (60) | | |
| MOD | | VARCHAR (10) | | |

Figure 20

Connection File to TMP_CONNECTION

| Column | Description | Type | P | M |
|---|---|---|---|---|
| WC_CLLI | 8 character LEIM WC CLLI code | VARCHAR (8) | Y | Y |
| CONNID | | NUM(4) | Y | Y |
| CABLE | | VARCHAR (10) | | |
| PAIR | | NUM(4) | | |
| PURPOSE | | VARCHAR (5) | | |
| TYPE | | CHAR(1) | | |
| FROMEQUIP | | VARCHAR (20) | | |
| FROMSHELF | | VARCHAR (4) | | |
| FROMSLOTLO | | NUM(4) | | |
| FROMSLOTHI | | NUM(4) | | |
| TOEQUIP | | VARCHAR (20) | | |
| TOSHELF | | VARCHAR (4) | | |
| TOSLOTLO | | NUM(4) | | |
| TOSLOTHI | | NUM(4) | | |
| LENGTH | | NUM(4) | | |
| DESIGNLOSS | | NUM(10,5) | | |
| BANDWIDTH | | NUM(4) | | |
| PULSE | | NUM(4) | | |
| WAVELEN | | NUM(4) | | |
| MEASLOSS | | NUM(10,5) | | |
| RESISTANCE | | NUM(4) | | |
| NOM1 | | VARCHAR (20) | | |
| NOM2 | | VARCHAR (20) | | |

Indexes: WC_CLLI, CABLE, PAIR Non-Unique and WC_CLLI, CONN_ID Non-Unique

Figure 21

Sysconn File to TMP_SYSCONN

| Column | Description | Type | P | M |
|---|---|---|---|---|
| WC_CLLI | 8 character LEIM WC CLLI code | VARCHAR (8) | | Y |
| CONNID | | NUM(4) | | Y |
| SYSID | | VARCHAR (20) | | Y |

Index: WC_CLLI, CONNID Non-Unique

Figure 22

Support_Pair File to TMP_SUPPORT_PAIR

| Column | Description | Type | P | M |
|---|---|---|---|---|
| WC_CLLI | 8 character LEIM WC CLLI code | VARCHAR (8) | Y | Y |
| EQUIPID | | VARCHAR (20) | Y | Y |
| PURPOSE | | VARCHAR (5) | | |
| CABLE | | VARCHAR (10) | Y | Y |
| PAIR | | NUM(8) | Y | Y |
| OW_SETTINGS | | VARCHAR (19) | | |
| OW_TELNUMBER | | VARCHAR (10) | | |
| PA_ID | | VARCHAR (6) | | |

Figure 23

Loop File to TMP_LOOP

| Column | Description | Type | P | M |
|---|---|---|---|---|
| WC_CLLI | 8 character LEIM WC CLLI code | VARCHAR (8) | Y | Y |
| LOOPID | | VARCHAR (8) | Y | Y |
| LOOP | | VARCHAR (60) | | |
| TERM | | VARCHAR (50) | | |
| STATUS | | VARCHAR (3) | | |
| FN_CA | | VARCHAR (10) | | |
| FN_PR | | NUM(8) | | |

Figure 24

Pair File to TMP_PAIR

| Column | Description | Type | P | M |
|---|---|---|---|---|
| WC_CLLI | 8 character LEIM WC CLLI code | VARCHAR (8) | Y | Y |
| CA | | VARCHAR (50) | Y | Y |
| PR | | NUM(8) | Y | Y |
| LOOPID | | VARCHAR (8) | | |
| PE | | VARCHAR (3) | | |

Figure 25

| | | |
|---|---|---|
| Name | : | LOCATION |
| Source | : | LEIM Location Table File |
| Description | : | Location Site for Loop Electronic Equipment |

| Column | Description | Type | P | M |
|---|---|---|---|---|
| LOCATION_ID | Oracle sequence ID | NUM(8) | Y | Y |
| WC_CLLI | 8 character LEIM WC CLLI code | VARCHAR(8) | | Y |
| LOCID | LEIM Location ID | VARCHAR (20) | | Y |
| CLLI | | VARCHAR (11) | | |
| ADDRESS | | VARCHAR(50) | | |
| ENCLOSURE | | VARCHAR(20) | | |
| CSA | | VARCHAR(8) | | |
| PLAT | | VARCHAR(8) | | |
| GEOCODE | | VARCHAR(8) | | |
| TAXCODE | | VARCHAR(3) | | |
| TELNUMBER | | VARCHAR(10) | | |
| POWER | | NUM(10,5) | | |
| POWEROUT | | VARCHAR(5) | | |
| REMARKS | | VARCHAR(50) | | |
| SHIP_ADDRESS | | VARCHAR(30) | | |
| SHIP_CITY_ST | | VARCHAR(20) | | |
| LOC_RTE | | VARCHAR(9) | | |
| STATUS | | VARCHAR(1) | | |
| STRUC_DATE | | DATE | | |
| INVEN_DATE | | DATE | | |
| DA | | VARCHAR(8) | | |
| AVAILABLET1S | | NUM(8) | | |
| ACTIVET1S | | NUM(8) | | |
| MUXCAP | | NUM(8) | | |
| ADSLCAP | | NUM(8) | | |
| ADSLAVAIL | | NUM(8) | | |
| ADSLWKG | | NUM(8) | | |

| Reference To | Primary Key | Foreign Key |
|---|---|---|
| | | |

| Index | Unique | Seq. | Column |
|---|---|---|---|
| LOCATION_LOCID_IDX | Y | 1 | WC_CLLI |
| | | 2 | LOCID |

Figure 27

| Name | : | EQUIPMENT |
|---|---|---|
| Source | : | LEIM Equipment Table File |
| Description | : | Equipment Information for Loop Electronics |

| Column | Description | Type | P | M |
|---|---|---|---|---|
| EQUIPMENT_ID | Oracle sequence ID | NUM(8) | Y | Y |
| LOCATION_ID | Oracle unique ID from LOCATION table | NUM(8) | | Y |
| WC_CLLI | 8 character LEIM WC CLLI code | VARCHAR(8) | | Y |
| EQUIPID | LEIM Equipment ID | VARCHAR (20) | | Y |
| LOCID | LEIM Location ID | VARCHAR (20) | | Y |
| CATEGORY | | VARCHAR (5) | | |
| BAY | | VARCHAR (10) | | |
| BAYUNIT | | NUM (8) | | |
| PRODUCTID | | VARCHAR (14) | | |
| GENERIC | | VARCHAR (5) | | |
| ACCOUNT | | VARCHAR (4) | | |
| VOLTAGE | | VARCHAR (5) | | |
| LOBITRATE | | NUM (10,5) | | |
| HIBITRATE | | NUM (10,5) | | |
| TEO | | VARCHAR (10) | | |
| STATUS | | VARCHAR (1) | | |
| INSTL_DATE | | DATE | | |
| MODE | | VARCHAR (4) | | |
| REMARKS | | VARCHAR (50) | | |
| FILTER | | VARCHAR (6) | | |
| CLEI | | VARCHAR (10) | | |
| EWO | | VARCHAR (10) | | |
| EQUIP_RTE | | VARCHAR (9) | | |
| EQ_SETTINGS | | VARCHAR (50) | | |
| PGPAIRS | | VARCHAR (20) | | |
| TESTPAIRS | | VARCHAR (15) | | |

| Reference To | Primary Key | Foreign Key |
|---|---|---|
| LOCATION | LOCATION_ID | LOCATION_ID |

| Index | Unique | Seq. | Column |
|---|---|---|---|
| EQUIPMENT_EQUIPID_IDX | Y | 1 | WC_CLLI |
| | | 2 | EQUIPID |
| EQUIPMENT_LOCID_IDX | | 1 | WC_CLLI |
| | | 2 | LOCID |

Figure 28

| Name | : | SLOT |
|---|---|---|
| Source | : | LEIM Slot Table File |
| Description | : | Slot Information for Loop Electronic Equipment |

| Column | Description | Type | P | M |
|---|---|---|---|---|
| SLOT_ID | Oracle sequence ID | NUM(8) | Y | Y |
| EQUIPMENT_ID | Oracle unique ID from EQUIPMENT table | NUM(8) | | Y |
| WC_CLLI | 8 character LEIM WC CLLI code | VARCHAR (8) | | Y |
| EQUIPID | LEIM Equipment ID | VARCHAR (20) | | Y |
| SHELF | | VARCHAR (4) | | |
| SLOT | | NUM(8) | | Y |
| CARD | | VARCHAR (10) | | |
| FUNCTION | | VARCHAR (5) | | |
| EWO | | VARCHAR (10) | | |
| STATUS | | VARCHAR(1) | | |
| CLEI | | VARCHAR (10) | | |
| SETTINGS | | VARCHAR (20) | | |
| RESISTANCE | | NUM(8) | | |
| RATE | | NUM(10,5) | | |
| MAX_LINES | | NUM(8) | | |
| FRAME_FORMAT | | VARCHAR (10) | | |
| LINE_CODE | | VARCHAR (10) | | |
| ERROR_RATE | | VARCHAR (10) | | |
| SUPER_SLOT | | VARCHAR (4) | | |
| CABLE | | VARCHAR (10) | | |
| LOWPAIR | | NUM(8) | | |
| HIGHPAIR | | NUM(8) | | |
| CIRCUITID | | VARCHAR (60) | | |
| TERMINAL | | VARCHAR (50) | | |
| T1STATUS | T1 status flag. DEFAULT to 0. | NUM(1) Default 0 | | Y |
| SYSTEMID | | VARCHAR (20) | | |

| Reference To | Primary Key | Foreign Key |
|---|---|---|
| EQUIPMENT | EQUIPMENT_ID | EQUIPMENT_ID |

| Index | Unique | Seq. | Column |
|---|---|---|---|
| SLOT_ID_IDX | Y | 1 | WC_CLLI |
| | | 2 | EQUIPID |
| | | 3 | SHELF |
| | | 4 | SLOT |

Figure 29

| Name | : | SYSTEM |
|---|---|---|
| Source | : | LEIM System Table File |
| Description | : | System Information for Loop Electronic Equipment |

| Column | Description | Type | P | M |
|---|---|---|---|---|
| SYSTEM_ID | Oracle sequence ID | NUM(8) | Y | Y |
| WC_CLLI | 8 character LEIM WC CLLI code | VARCHAR (8) | | Y |
| SYSID | LEIM System ID | VARCHAR (20) | | Y |
| ORIG_EQUIPMENT_ID | Oracle unique ID from EQUIPMENT table | NUM(8) | | |
| TERM_EQUIPMENT_ID | Oracle unique ID from EQUIPMENT table | NUM(8) | | |
| ORIGEQUIP | LEIM Equipment ID | VARCHAR (20) | | |
| TERMEQUIP | LEIM Equipment ID | VARCHAR (20) | | |
| MAJALARM | | VARCHAR (60) | | |
| MINALARM | | VARCHAR (60) | | |
| CLOCKING | | VARCHAR (60) | | |
| PROTECTION | | VARCHAR (60) | | |
| SIGLEAD | | VARCHAR(1) | | |
| REMARKS | | VARCHAR (100) | | |
| SERVDATE | | DATE | | |
| INTEGRATED | | VARCHAR(1) | | |
| TIRKS_ACT | | VARCHAR(1) | | |
| ISDN | | VARCHAR (15) | | |
| LENGTH | | NUM(8) | | |
| STATEBIT | | NUM(8) | | |
| LASTMODBY | | VARCHAR (12) | | |
| CRITALARMS | | VARCHAR (60) | | |
| MOD | | VARCHAR (10) | | |

| Reference To | Primary Key | Foreign Key |
|---|---|---|
| EQUIPMENT | EQUIPMENT_ID | ORIG_EQUIPMENT_ID |
| EQUIPMENT | EQUIPMENT_ID | TERM_EQUIPMENT_ID |

| Index | Unique | Seq. | Column |
|---|---|---|---|
| SYSTEM_SYSID_IDX | Y | 1 | WC_CLLI |
| | | 2 | SYSID |
| SYSTEM_ORIG_IDX | N | 1 | WC_CLLI |
| | | 2 | ORIGEQUIP |
| SYSTEM_TERM_IDX | N | 1 | WC_CLLI |
| | | 2 | TERMEQUIP |

Figure 30

Name       : GRPMAP

Source     :

Description :

| Column | Description | Type | P | M |
|---|---|---|---|---|
| WC_CLLI | 8 character LEIM WC CLLI code | VARCHAR (8) | Y | Y |
| STATE | RTS State Code | VARCHAR (10) | | Y |
| DISTRICT | RTS District Code | VARCHAR (10) | | Y |
| SUBDISTRICT | | VARCHAR (10) | | |
| LEIS_MACHINE | LEIS Machine Code for wire center | VARCHAR (10) | | |
| NAME | | VARCHAR (10) | | |
| ENGLISH_NAME | | VARCHAR (10) | | |

| Reference To | Primary Key | Foreign Key |
|---|---|---|
| | | |

| Index | Unique | Seq. | Column |
|---|---|---|---|
| | | | |

Figure 31

Table = LOCATION

| Column | Source Table | Source Column | Rules/Notes |
|---|---|---|---|
| LOCATION_ID | N/A | N/A | Oracle Sequence generated unique ID |
| WC_CLLI | TMP_LOCATION | WC_CLLI | |
| LOCID | | LOCID | |
| CLLI | | CLLI | |
| ADDRESS | | ADDRESS | |
| ENCLOSURE | | ENCLOSURE | |
| CSA | | CSA | |
| PLAT | | PLAT | |
| GEOCODE | | GEOCODE | |
| TAXCODE | | TAXCODE | |
| TELNUMBER | | TELNUMBER | |
| POWER | | POWER | |
| POWEROUT | | POWEROUT | |
| REMARKS | | REMARKS | |
| SHIP_ADDRESS | | SHIP_ADDRESS | |
| SHIP_CITY_ST | | SHIP_CITY_ST | |
| LOC_RTE | | LOC_RTE | |
| STATUS | | STATUS | |
| STRUC_DATE | | STRUC_DATE | |
| INVEN_DATE | | INVEN_DATE | |
| DA | | DA | |
| AVAILABLET1S | | | |
| ACTIVET1S | | | |
| MUXCAP | | | |
| ADSLCAP | | | |
| ADSLAVAIL | | | |
| ADSLWKG | | | |

Figure 32

Table = EQUIPMENT

| Column | Source Table | Source Column | Rules/Notes |
|---|---|---|---|
| EQUIPMENT_ID | N/A | N/A | Oracle Sequence generated unique ID |
| LOCATION_ID | LOCATION | LOCATION_ID | |
| WC_CLLI | TMP_EQUIPMENT | WC_CLLI | |
| EQUIPID | | EQUIPID | |
| LOCID | | LOCID | |
| CATEGORY | | CATEGORY | |
| BAY | | BAY | |
| BAYUNIT | | BAYUNIT | |
| PRODUCTID | | PRODUCTID | |
| GENERIC | | GENERIC | |
| ACCOUNT | | ACCOUNT | |
| VOLTAGE | | VOLTAGE | |
| LOBITRATE | | LOBITRATE | |
| HIBITRATE | | HIBITRATE | |
| TEO | | TEO | |
| STATUS | | STATUS | |
| INSTL_DATE | | INSTL_DATE | |
| MODE | | MODE | |
| REMARKS | | REMARKS | |
| FILTER | | FILTER | |
| CLEI | | CLEI | |
| EWO | | EWO | |
| EQUIP_RTE | | EQUIP_RTE | |
| EQ_SETTINGS | | EQ_SETTINGS | |
| PGPAIRS | TMP_CONNECTION | | |
| TESTPAIRS | TMP_SUPPORT_PAIR | | |

Figure 33

Table = SLOT

| Column | Source Table | Source Column | Rules/Notes |
|---|---|---|---|
| SLOT_ID | N/A | N/A | Oracle Sequence generated unique ID |
| EQUIPMENT_ID | EQUIPMENT | EQUIPMENT_ID | |
| WC_CLLI | TMP_SLOT | WC_CLLI | |
| EQUIPID | | EQUIPID | |
| SHELF | | SHELF | |
| SLOT | | SLOT | |
| CARD | | CARD | |
| FUNCTION | | FUNCTION | |
| EWO | | EWO | |
| STATUS | | STATUS | |
| CLEI | | CLEI | |
| SETTINGS | | SETTINGS | |
| RESISTANCE | | RESISTANCE | |
| RATE | | RATE | |
| MAX_LINES | | MAX_LINES | |
| FRAME_FORMAT | | FRAME_FORMAT | |
| LINE_CODE | | LINE_CODE | |
| ERROR_RATE | | ERROR_RATE | |
| SUPER_SLOT | | SUPER_SLOT | |
| CABLE | TMP_CONNECTION | CABLE | |
| LOWPAIR | TMP_CONNECTION | PAIR | |
| HIGHPAIR | TMP_CONNECTION | PAIR | |
| CIRCUITID | TMP_LOOP | LOOP | |
| TERMINAL | TMP_LOOP | TERM | |
| T1STATUS | n/a | n/a | |
| SYSTEMID | EQUIPMENT | SYSID | Where EQUIPMENT.equipid = SLOT.equipid (may be null) |

Figure 34

- Table = SYSTEM

| Column | Source Table | Source Column | Rules/Notes |
|---|---|---|---|
| SYSTEM_ID | N/A | N/A | Oracle Sequence generated unique ID |
| WC_CLLI | TMP_SYSTEM | WC_CLLI | |
| SYSID | TMP_SYSTEM | SYSID | |
| ORIG_EQUIPMENT_ID | EQUIPMENT | EQUIPMENT_ID | Where SYSTEM.origequip = EQUIPMENT.equipid |
| TERM_EQUIPMENT_ID | EQUIPMENT | EQUIPMENT_ID | Where SYSTEM.termequip = EQUIPMENT.equipid |
| ORIGEQUIP | TMP_SYSTEM | ORIGEQUIP | |
| TERMEQUIP | | TERMEQUIP | |
| MAJALARM | | MAJALARM | |
| MINALARM | | MINALARM | |
| CLOCKING | | CLOCKING | |
| PROTECTION | | PROTECTION | |
| SIGLEAD | | SIGLEAD | |
| REMARKS | | REMARKS | |
| SERVDATE | | SERVDATE | |
| INTEGRATED | | INTEGRATED | |
| TIRKS_ACT | | TIRKS_ACT | |
| ISDN | | ISDN | |
| LENGTH | | LENGTH | |
| STATEBIT | | STATEBIT | |
| LASTMODBY | | LASTMODBY | |
| CRITALARMS | | CRITALARMS | |
| MODE | | MODE | |

Figure 35

Table = GRPMAP

| Column | Source Table | Source Column | Rules/Notes |
|---|---|---|---|
| WC_CLLI | | | Manually populated |
| STATE | | | |
| DISTRICT | | | |
| SUBDISTRICT | | | |
| LEIS_MACHINE | | | |
| NAME | | | |
| ENGLISH_NAME | | | |

Figure 36

Equipment View

| Name | : | V_{wctrclli}_EQUIPMENT |
|---|---|---|
| Source | : | EQUIPMENT |
| Description | : | |

| Column | Description | Type | P | M |
|---|---|---|---|---|
| EQUIPID | | VARCHAR (20) | Y | Y |
| LOCID | | VARCHAR (20) | | |
| CATEGORY | | VARCHAR (5) | | |
| BAY | | VARCHAR (10) | | |
| BAYUNIT | | NUM (8) | | |
| PRODUCTID | | VARCHAR (14) | | |
| GENERIC | | VARCHAR (5) | | |
| ACCOUNT | | VARCHAR (4) | | |
| VOLTAGE | | VARCHAR (5) | | |
| LOBITRATE | | NUM (10,5) | | |
| HIBITRATE | | NUM (10,5) | | |
| TEO | | VARCHAR (10) | | |
| STATUS | | VARCHAR (1) | | |
| INSTL_DATE | | DATE | | |
| MODE | | VARCHAR (4) | | |
| REMARKS | | VARCHAR (50) | | |
| FILTER | | VARCHAR (6) | | |
| CLEI | | VARCHAR (10) | | |
| EWO | | VARCHAR (10) | | |
| EQUIP_RTE | | VARCHAR (9) | | |
| EQ_SETTINGS | | VARCHAR (50) | | |
| PGPAIRS | | VARCHAR (20) | | |
| TESTPAIRS | | VARCHAR (15) | | |
| WCTRCLLI | | VARCHAR (8) | | |

Figure 37

2. Location View

| Name | : V_{wctrclli}_LOCATION |
|---|---|
| Source | : LOCATION |
| Description | : |

| Column | Description | Type | P | M |
|---|---|---|---|---|
| LOCID | | VARCHAR (20) | Y | Y |
| CLLI | | VARCHAR (11) | | |
| ADDRESS | | VARCHAR(50) | | |
| ENCLOSURE | | VARCHAR(20) | | |
| CSA | | VARCHAR(8) | | |
| PLAT | | VARCHAR(8) | | |
| GEOCODE | | VARCHAR(8) | | |
| TAXCODE | | VARCHAR(6) | | |
| TELNUMBER | | VARCHAR(10) | | |
| POWER | | NUM(10,5) | | |
| POWEROUT | | VARCHAR(5) | | |
| REMARKS | | VARCHAR(50) | | |
| SHIP_ADDRESS | | VARCHAR(30) | | |
| SHIP_CITY_ST | | VARCHAR(20) | | |
| LOC_RTE | | VARCHAR(9) | | |
| STATUS | | VARCHAR(1) | | |
| STRUC_DATE | | DATE | | |
| INVEN_DATE | | DATE | | |
| DA | | VARCHAR(8) | | |
| AVAILABLET1S | | NUM(8) | | |
| ACTIVET1S | | NUM(8) | | |
| MUXCAP | | NUM(8) | | |
| ADSLCAP | | NUM(8) | | |
| ADSLAVAIL | | NUM(8) | | |
| ADSLWKG | | NUM(8) | | |
| WCTRCLLI | | VARCHAR (8) | | |

Figure 38

3. Slot View

| Name | : V_{wctrclli}_SLOT |
|---|---|
| Source | : SLOT |
| Description | : |

| Column | Description | Type | P | M |
|---|---|---|---|---|
| EQUIPID | | VARCHAR (20) | Y | Y |
| SHELF | | VARCHAR (4) | | |
| SLOT | | NUM(8) | | |
| CARD | | VARCHAR (10) | | |
| FUNCTION | | VARCHAR (5) | | |
| EWO | | VARCHAR (10) | | |
| STATUS | | VARCHAR(1) | | |
| CLEI | | VARCHAR (10) | | |
| SETTINGS | | VARCHAR (20) | | |
| RESISTANCE | | NUM(8) | | |
| RATE | | NUM(10,5) | | |
| MAX_LINES | | NUM(8) | | |
| FRAME_FORMAT | | VARCHAR (10) | | |
| LINE_CODE | | VARCHAR (10) | | |
| ERROR_RATE | | VARCHAR (10) | | |
| SUPER_SLOT | | VARCHAR (4) | | |
| CABLE | | VARCHAR (10) | | |
| LOWPAIR | | NUM(8) | | |
| HIGHPAIR | | NUM(8) | | |
| CIRCUITID | | VARCHAR (60) | | |
| TERMINAL | | VARCHAR (50) | | |
| T1STATUS | | NUMBER (1) Default 0 | | |
| SYSTEMID | | VARCHAR (20) | | |
| WCTRCLLI | | VARCHAR (8) | | |

Figure 39

4. System View

| Name | : V_{wctrclli}_SYSTEM |
|---|---|
| Source | : SYSTEM |
| Description | : |

| Column | Description | Type | P | M |
|---|---|---|---|---|
| SYSID | | VARCHAR (20) | Y | Y |
| ORIGEQUIP | | VARCHAR (20) | | |
| TERMEQUIP | | VARCHAR (20) | | |
| MAJALARM | | VARCHAR (60) | | |
| MINALARM | | VARCHAR (60) | | |
| CLOCKING | | VARCHAR (60) | | |
| PROTECTION | | VARCHAR (60) | | |
| SIGLEAD | | VARCHAR(1) | | |
| REMARKS | | VARCHAR (100) | | |
| SERVDATE | | DATE | | |
| INTEGRATED | | VARCHAR(1) | | |
| TIRKS_ACT | | VARCHAR(1) | | |
| ISDN | | VARCHAR (15) | | |
| LENGTH | | NUM(8) | | |
| STATEBIT | | NUM(8) | | |
| LASTMODBY | | VARCHAR (12) | | |
| CRITALARMS | | VARCHAR (60) | | |
| MODE | | VARCHAR (10) | | |
| WCTRCLLI | | VARCHAR (8) | | |

Figure 40

5. Districts View

| Name | : | V_DISTRICTS |
|---|---|---|
| Source | : | GRPMAP |
| Description | : | |

| Column | Description | Type | P | M |
|---|---|---|---|---|
| STATE | | VARCHAR (10) | Y | Y |
| DISTRICT | | VARCHAR (10) | Y | Y |

| Equipment | Port | Card | Function | Cable | Low | High | CircuitID | SystemID | Term | FWO |
|---|---|---|---|---|---|---|---|---|---|---|
| rt6317a1ddm1000#0003 | a-1 | aek36c | ds1 | | 0 | 0 | | | | t8617 |
| rt6317a1ddm1000#0003 | a-2 | aek36c | ds1 | | 0 | 0 | | | | t8617 |
| rt6317a1ddm1000#0003 | a-3 | aek36c | ds1 | | 0 | 0 | | | | t8617 |
| rt6317a1ddm1000#0003 | a-4 | aek36c | ds1 | | 0 | 0 | | | | t8617 |
| rt6317a1ddm1000#0003 | a-5 | aek36c | ds1 | | 0 | 0 | | | | t8617 |
| rt6317a1ddm1000#0003 | a-6 | aek36c | ds1 | | 0 | 0 | | | | t8617 |
| rt6317a1ddm1000#0003 | a-7 | aek36c | ds1 | | 0 | 0 | | | | t8617 |
| rt6317a1ddm1000#0003 | a-8 | aek36c | ds1p | | 0 | 0 | | | | t8617 |
| rt6317a1ddm1000#0003 | a-9 | aek39 | ds1 | | 0 | 0 | | | | t8617 |
| rt6317a1ddm1000#0003 | a-11 | active | ds1p | mda6317 | 1 | 2 | ckt dlc.pg10.9030.1 | islc5#5030 | | t8617 |
| rt6317a1ddm1000#0003 | a-12 | active | ds1p | mda6317 | 3 | 4 | ckt dlc.pg10.9030.2 | islc5#5030 | | t8617 |
| rt6317a1ddm1000#0003 | a-13 | active | ds1p | mda6317 | 5 | 6 | ckt dlc.pg10.9030.3 | islc5#5030 | | t8617 |
| rt6317a1ddm1000#0003 | a-14 | active | ds1p | mda6317 | 7 | 8 | ckt dlc.pg10.9030.4 | islc5#5030 | | t8617 |
| rt6317a1ddm1000#0003 | a-21 | active | ds1p | mda6317 | 9 | 10 | ckt dlc.pg10.9031.1 | islc5#5031 | | t8617 |
| rt6317a1ddm1000#0003 | a-22 | active | ds1p | mda6317 | 11 | 12 | ckt dlc.pg10.9031.2 | islc5#5031 | | t8617 |
| rt6317a1ddm1000#0003 | a-23 | active | ds1p | mda6317 | 13 | 14 | ckt dlc.pg10.9031.3 | islc5#5031 | | t8617 |
| rt6317a1ddm1000#0003 | a-24 | active | ds1p | mda6317 | 15 | 16 | ckt dlc.pg10.9031.4 | islc5#5031 | | t8617 |
| rt6317a1ddm1000#0003 | a-31 | active | ds1p | mda6317 | 17 | 18 | ckt dlc.pg10.9032.1 | islc5#5032 | | t8617 |
| rt6317a1ddm1000#0003 | a-32 | active | ds1p | mda6317 | 19 | 20 | ckt dlc.pg10.9032.2 | islc5#5032 | | t8617 |
| rt6317a1ddm1000#0003 | a-33 | active | ds1p | mda6317 | 21 | 22 | ckt dlc.pg10.9032.3 | islc5#5032 | | t8617 |
| rt6317a1ddm1000#0003 | a-34 | active | ds1p | mda6317 | 23 | 24 | ckt dlc.pg10.9032.4 | islc5#5032 | | t8617 |
| rt6317a1ddm1000#0003 | a-41 | active | ds1p | mda6317 | 25 | 26 | ckt dlc.pg10.9033.1 | islc5#5033 | | t8617 |
| rt6317a1ddm1000#0003 | a-42 | active | ds1p | mda6317 | 27 | 28 | ckt dlc.pg10.9033.2 | islc5#5033 | | t8617 |
| rt6317a1ddm1000#0003 | a-43 | active | ds1p | mda6317 | 29 | 30 | ckt dlc.pg10.9033.3 | islc5#5033 | | t8617 |
| rt6317a1ddm1000#0003 | a-44 | active | ds1p | mda6317 | 31 | 32 | ckt dlc.pg10.9033.4 | islc5#5033 | | t8617 |
| rt6317a1ddm1000#0003 | a-51 | active | ds1p | mda6317 | 33 | 34 | ckt dlc.pg10.9036.1 | 96sl5#5036 | | t8617 |
| rt6317a1ddm1000#0003 | a-52 | active | ds1p | mda6317 | 35 | 36 | ckt dlc.pg10.9036.2 | 96sl5#5036 | | t8617 |
| rt6317a1ddm1000#0003 | a-53 | active | ds1p | mda6317 | 37 | 38 | ckt dlc.pg10.9036.3 | 96sl5#5036 | | t8617 |
| rt6317a1ddm1000#0003 | a-54 | active | ds1p | mda6317 | 39 | 40 | ckt dlc.pg10.9036.4 | 96sl5#5036 | | t8617 |
| rt6317a1ddm1000#0003 | a-61 | active | ds1p | mda6317 | 41 | 42 | ckt dlc.pg10.5037.1 | islc5#5037 | | t8617 |
| rt6317a1ddm1000#0003 | a-62 | active | ds1p | mda6317 | 43 | 44 | ckt dlc.pg10.5037.2 | islc5#5037 | | t8617 |
| rt6317a1ddm1000#0003 | a-63 | active | ds1p | mda6317 | 45 | 46 | ckt dlc.pg10.5037.3 | islc5#5037 | | t8617 |
| rt6317a1ddm1000#0003 | a-64 | active | ds1p | mda6317 | 47 | 48 | ckt dlc.pg10.5037.4 | islc5#5037 | | t8617 |
| rt6317a1ddm1000#0003 | a-71 | active | ds1p | mda6317 | 49 | 50 | 38 hcas 653770 | | | t8617 |

Figure 45

| Equipment | Category | Bay | Unit | Product ID | Generic | Account | Voltage |
|---|---|---|---|---|---|---|---|
| coddm1000#0018 | mux | 01101.05 | 06 | attddm1000co | | 257c | -48 |
| coddm1000#0020 | mux | 01101.05 | 08 | attddm1000co | | 257c | -48 |
| coddm1000#0021 | mux | 01101.10 | 01 | attddm1000co | | 257c | -48 |
| coddm1000#0022 | mux | 01101.10 | 02 | attddm1000co | | 257c | -48 |
| coddm1000#0023 | rt6229a1ddm1000#0023 | .10 | 03 | attddm1000co | | 257c | -48 |
| coddm1000#0024 | | .10 | 04 | attddm1000co | | 257c | -48 |
| coddm1000#0025 | mux | 01101.10 | 05 | attddm1000co | | 257c | -48 |
| coddm1000#0026 | mux | 01101.10 | 06 | attddm1000co | | 257c | -48 |
| coddm1000#0027 | mux | 01101.10 | 07 | attddm1000co | | 257c | -48 |
| coddm1000#0028 | mux | 01101.10 | 08 | attddm1000co | | 257c | -48 |
| coddm1000#0029 | mux | 01101.11 | 01 | attddm1000co | | 257c | -48 |
| coddm1000#0030 | mux | 01101.11 | 02 | attddm1000co | | 257c | -48 |
| coddm1000#0031 | mux | 01101.11 | 03 | attddm1000co | | 257c | -48 |
| coddm1000#0032 | mux | 01101.11 | 04 | attddm1000co | | 257c | -48 |

Phone #:
Power: 0
Powerout:
Total T1s Working @ Site: 0
Add'l T1s Available (based on CO): 0
Total T1s (Mux Capacity): 0

Figure 47

SYSTEM AND METHOD FOR TRACKING TELEPHONE NETWORK CAPACITY AND EQUIPMENT

BACKGROUND

1. Field of the Invention

The present invention is directed to the management of telephone systems. More particularly, the present invention is directed to systems and methods for assisting in the management of several telephone network systems, devices and equipment. Even more particularly, the present invention is directed to assisting a loop capacity manager in managing specific telephone network capacities and equipment; the invention is also directed to identifying locations for marketing where certain service types are available in a shorter interval.

2. Background of the Invention

Telephone facilities are managed using a cable name and a pair range. This method originated in the days when the only facility was a copper cable which originated at the Central Office (CO). The cable leaving the CO to the north might be called cable 1, the cable to the east might be cable 2, and so on. Cable 1 might have 1800 pairs, thus it is denoted as 1: 1–1800 (or 1, 1–1800.) A customer's telephone number can then be reported as working on a particular pair such as 2:27.

As facility types have expanded to include digital loop carrier (DLC), fiber optic cables, and multiplexers, telephone companies have continued to use the same notation. In these cases, an attempt is made to logically name the cable. The first DLC systems were manufactured by Pair Gain, Inc., thus the naming convention for DLC systems of PG. For example, the first DLC system in a CO might be PG10, 1–100 (a pair gain system can provide 96 lines, so the notation typically uses a range of 1–100 for the sake of simplicity.) Multiplexers are used in the local loop to convert fiber optic signals to DS-1 copper services. These DS-1 facilities are managed with a cable name of MD for multiplexer derived and an appropriate pair range.

More specifically, FIG. 1 depicts a typical telephone network including a first central office 10 that is connected, via connection pathway 11, to a second central office 12. Communication pathway 11 is of a known character and might comprise copper cable, fiber optic cable or radio frequency connectivity, or combinations of these mediums. Central office 12 (and likely 10, as well) includes a multiplexer/demultiplexer (MUX) 15 such as an OC-3 multiplexer or MUX, which might be operable to, for example, convert 3 DS-3 service lines into 84 T-1 or 84 DS-1 service lines, and vice versa.

MUX 15 is typically connected, via fiber optic cable 17, to a remote terminal (RT) 20 that houses a digital loop carrier (DLC) system or pair gain (PG) device 22 that is operable to convert DS-1 service levels to DS-0 service levels. Commercially-available pair gain devices are, for example, operable to convert between 4 DS-1 service lines and 96 DS-0 service lines.

The resulting individual DS-0 lines are typically connected, or fed, to a cross connect or cross box 25, via a feeder cable 24 that includes a plurality of copper pairs. In a typical telephone network, cable 24 might have anywhere from 1–1800 pairs of twenty-two, twenty-four or twenty-six gauge twisted pair copper wire.

The other side of cross box 25 (the right side in FIG. 1) is connected to a distribution cable 27, which also includes a plurality of copper wire pairs that are used, respectively, to service individual customers 30a, 30b, 30c, 30d. Some customers 30 will have the need for several telephone lines to furnish combinations of, e.g., telephone service, computer modems, fax machines, ISDN, T1, ADSL, etc. Such customers will thus require more that one twisted pair of copper wire. Cross box 25 is thus used to connect customer lines 29a, 29b, 29c, 29d to the appropriate DS-0 service line made available via feeder cable 24.

In many cases central office 12 can be connected directly to cross box 25 via copper cable 32, thereby bypassing a separate remote terminal. In such a case, the central office itself might include the functionality of the remote terminal including the pair gain device.

As can be readily appreciated by those skilled in the art, managing the network and equipment shown in FIG. 1 and described above can be daunting. Typically, a loop capacity manager (LCM), i.e., the manager responsible for the "local loop," is responsible for (i) keeping track of network capacities, equipment capacities and physical plant, (ii) determining whether bottlenecks are occurring or whether shortages are about to occur and (iii) proposing or preparing a plan of action for alleviating any such bottlenecks or shortages.

Telcordia, Morristown, N.J., is one manufacturer of telecommunications management software that captures various pieces of information that describe the several aspects of the local loop in an attempt to aid LCMs in managing the telephone network. One Telcordia product, commonly known as LFACS (Loop Facility Assignment Control System), which is used by most of the regional bell operating companies (RBOCs), functions as a database of record for all local loop services by storing information about each of the service levels in the local loop including direct customer DS-1 service, "plain old telephone service (POTS)," and even party line service that still may be available in rural areas.

However, LFACS, by itself is limited in its ability to provide all of the information that may be necessary for an LCM to effectively manage the local loop. Specifically, LFACS includes only assignment data in the form of cable name and pair range. There is no information in LFACS that describes equipment.

To keep track of equipment, such as MUX's, SLCs and DLCs, RBOCs maintain several databases that capture equipment information. However, such databases typically do not also contain assignment data. That is, although an LCM might have access to both a database such as LFACS and another database that stores equipment information, the two databases are not tied together in any meaningful way. Indeed, it is often the case such databases are maintained by different entities, which causes the databases to be inconsistent with respect to each other. Accordingly, it is very difficult for an LCM to take advantage of the available information to conduct his local loop management function.

In addition to the foregoing, the desire for increased bandwidth has skyrocketed in the past decade. This has resulted in customers gaining direct access to DS-1/T-1 and higher data rate service lines, rather than only DS-0 service lines. As a result, LCMs have also been recently tasked with managing these lines as well.

Further, Digital Service Line (DSL) demand has also increased significantly in the past several years. Tracking and managing DSL usage is also typically the responsibility of the LCM. However, current management tools are insufficient for managing ADSL as a part of the entire telephone network.

SUMMARY OF THE INVENTION

The present invention is directed to a system and method for assimilating information from disparate information sources. More specifically, the present invention taps into sub-components of several telecommunications systems, including but not limited to LEIS and CBM (a backup mechanism for TIRKS available from CBM Information Systems, Little Rock, Ark.), and extracts selected pieces of information so that telecommunications equipment in the local loop can be organized by wire center and location and so that information concerning usage data of equipment slots and ports can be easily examined or compared to one another.

A goal of the present invention is to present the extracted and assimilated data to a user via a graphical user interface and/or world wide web interface.

At a very high-level, the process in accordance with the present invention comprises extracting data from certain tables in LEIM and LEAD (sub-components of LEIS) and CBM porting the data over to an Oracle database, performing data summary routines, and presenting the data through a graphical user interface. In a preferred embodiment, temporary tables are provided in which the summary routines are performed. Separate tables are populated to support the graphical user interface. The present invention, also referred to herein as Facility Assignment Specialist (FAS), addresses the following fundamental problems: determining the availability of DS-1's at on-premises muxes, making that information available to customers, comparing data from several systems and planning and analyzing information from the several databases and information sources.

In this regard the present invention provides:
1) a means for determining the availability of certain services (e.g., DS-1 services) at select locations and making that availability information known to a particular set of wholesale customers, thereby allowing those wholesale customers to order these services and have them installed in a shorter period of time than they would otherwise be possible.
2) graphical presentation of data (iView)
3) comparison of LEAD and LEIM data for DS 1 ports (iView)
4) a means of comparing that data residing in, for example, LFACS/LEAD, LEIM, and TIRKS databases and presenting it to a user as needed.
5) A simple GUI for running reports based off of LEAD data to determine cross box and RT site exhaust and utilization.
6) Tools for creating, storing, and publishing relief plans.

ASIP (automated short-interval provisioning) functionality, which is preferably employed as the means for determining the availability of certain services, arose out of a need to improve service to wholesale (or access) customers. Access customers are willing to pay more for a service if they can receive a guarantee that the service will be available by a certain date. Many access customers desire service at locations where service (typically DS-1/T1) is readily available. RBOCs therefore need a means of monitoring those locations, determine which locations have available capacity, and presenting that information to the customer service representatives who serve the access customers in a manner which does not unnecessarily burden the customer service representatives.

Using the present invention, planners, i.e., LCMs and others, can view Central Office (CO) or individual Remote Terminal (RT) information including:
Location Information:
General (address, Alarm Wiring Figure—AWF, when it was placed, etc.)
MUX capacity (T1s a available, T1s working, total T1s)
ADSL capacity (available, working, total)
Individual pieces of equipment at the location
Equipment Information (All fields from Equipment table in LEIM)
Equipment IDs
Bay, Unit
SCIDs, TIDs
HECI Codes
Slot information
Circuit Identifier Information from each application (LEAD, TIRKS)
System Information In addition, color-coded capacity indicators displayed in the GUI simplifies identifying "trouble spots". Also, for muxes, the present invention provides easy navigation to other nodes within a ring topology. Still further, the present invention preferably incorporates pictures of individual Remote Terminals, including casements, cabinets, equipment and cards for equipment, whereby a visual cue of the equipment can aid a LCM to recall the type of equipment for which data is being displayed.

It is therefore an object of the present invention to provide a system and method for assimilating information from several databases to provide useful analytic tools for telephone network managers.

It is also an object of the present invention to provide a system and method for providing an intuitive graphical user interface that presents information about telecommunications equipment, slots, and locations is an intuitive fashion.

It is also an object of the present invention to provide a system and method for extracting telecommunications information concerning the local loop and the interoffice connections from legacy computer databases and systems and porting the extracted information to a user-friendly environment.

It is still a further object of the present invention to provide a system and method for providing information about the outside plant of a telephone network that is arranged, at least initially, by wire center.

It is also an object of the present invention to provide a system and method for providing local loop managers with tools to manage the various telecommunications facilities for which they are responsible.

It is also an object of the present invention to provide a system and method for determining which locations have sufficient facilities available for particular service types and, upon a request for service from certain customers, return to the user information as to the availability of that service.

These and other objects of the present invention will become apparent upon a reading of the following detailed description in conjunction with the associated drawings.

BRIEF DESCRIPTION OF THE DRAWINGS

FIGS. 4–12 depict the relevant LEIS tables, variable fields and sizes of fields to the present invention.

FIGS. 17–25 respectively depict preferred formats for each of the temporary tables in accordance with the present invention.

FIGS. 27–31 depict each of the tables shown in FIG. 26 in more detail.

FIGS. 32–36 illustrate how each of the tables of FIGS. 27–31 are populated in accordance with the present invention.

FIGS. 37–41 show tables used for implementing the several data views contemplated by the present invention.

FIGS. 42–47 illustrate exemplary graphical user interface display screens in accordance with the present invention.

DETAILED DESCRIPTION OF THE INVENTION

The present invention will now be described in the greater detail using BellSouth Telephone (BST) as specific example. However, those skilled in the art will appreciate that the present invention is applicable to any regional bell operating company (RBOC), local exchange carrier (LEC) or competing LEC (CLEC) or any other telecommunications service provider that needs to manage telecommunications facilities. The present invention comprises several components that are aggregated to provide meaningful information to a loop capacity manager (LCM). In a preferred embodiment of the present invention, a user friendly graphical user interface (GUI) is made available to a user. This GUI and underlying systems and methods is sometimes referred to herein as "iView" (Inventory View), which is an actual implementation of the present invention.

The following description is divided into the following sections:

1. Overview—A brief overview of the areas within BellSouth affected by iView.
2. LEIS Requirements—This section describes the requirements needed to gather data from the LEIS database.
3. Interface Specifications—This section explains the interface between the LEIS system and the Oracle database which provides the data for iView.
4. Oracle Requirements—This section reviews the database structure needed to power iView including size and structure of the tables, views, and the business rules for the underlying data source.
5. iView Graphical User Interface—This section describes the iView GUI functionality and what information is conveyed to the user.
6. TIRKS matching—This section describes how data in TIRKS, CBM and LEIM and LEAD is reconciled
7. Crossbox tracking—This section describes tracking feeder-distribution interfaces (FDI.

1. Overview

The present invention is mainly concerned with the part of the LEC (Local Exchange Carrier) telephone network that is physically located outside of telephone company buildings. This includes cables, conduits, poles and other supporting structures and certain equipment. Generally speaking, outside plant includes the local loops from the LEC's switching centers to the customers' premises, and all facilities which serve to interconnect the various switches (e.g., central office and tandem) in the carrier's internal network. Dedicated outside plant comprises local loop facilities which are dedicated from the switching center to the customer's premises.

BST Hierarchy

Figure 2:
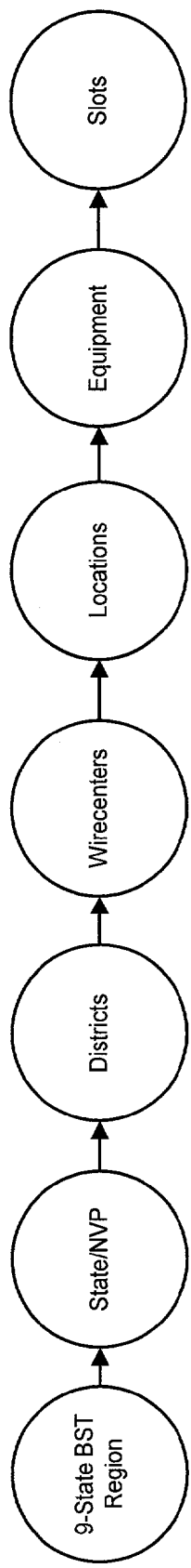
FIG. 2 is a schematic diagram of how a regional bell operating company (RBOC) can be broken down.

Referring to FIG. 2, Bellsouth's network is (as are other typical telephone networks) divided into logical areas and sub-categories therein. The hierarchy is:

- 9-state BellSouth region (Alabama, Florida, Georgia, Kentucky, Louisiana, Mississippi, North Carolina, South Carolina, Tennessee)
- The 9-state region is broken down into state/NVP (Network Vice President). These areas are geographically divided by each state with the exception of Florida which is divided into North Florida and South Florida.
- Each state is broken down into districts. There are a total of 38 districts in BellSouth.
- Each district is broken down into wire centers. There are approximately 1600 wire centers in BellSouth.
- Each wire center is broken down by location. One location is the central office (CO), which supplies service to remote terminals (RTs). The relationship between locations is one CO to many RTs
- At each location, there is equipment.
- Certain pieces of equipment can be further broken down into slots.

Planning and Provisioning

The planning and provisioning process is handled primarily by a group of LCMs. As previously explained, the LCMs' responsibilities include (but are not limited to):

- Planning and providing facilities (circuits, equipment, capacity) for service to potential customers within a given wire center;
- Maintaining knowledge of equipment inventory and technology of that equipment within an assigned wire center; and
- Budgeting and forecasting for their wire center.

Databases

Much of the data that LCMs use in their day-to-day planning is kept up in various databases. They use this data to run reports and analyze possible trouble areas or potential growth areas. One system of databases is the well-known LEIS (Loop Electronic Inventory System) system, available from Telcordia, Morristown, N.J. The LEIS system is a versatile decision support system that is used by field and staff engineering operations for the daily planning and design of the outside plant network. It is a software system that uses the UNIX SVR4 operating system and the Ingres 6 database manager which allows the user to create programs and to manipulate data to custom build reports based on specific planning and design needs. Within LEIS are two large databases known as LEIM (Loop Electronic Inventory Module) and LEAD (Loop Engineering Assignment Data).

LEIM is a module of the LEIS System used to inventory Loop Electronics (LE) sites, equipment, plug-ins, connections and systems. The LEIM module contains data related to digital loop carriers (DLC), loop multiplexers (MUX), optical fiber systems and other loop electronics. It shares data with other LEIS application modules in order to produce administrative reports, inventory reports, utilization reports, and to support the design, planning, budgeting, ordering, and forecasting of loop electronics equipment.

The Loop Engineering Assignment Data (LEAD) module of the LEIS system is used by the outside plant engineer to support the planning and design of the local loop. The Loop Facilities Assignment and Control System (LFACS) is the component of the Facility Assignment and Control System (FACS) that inventories outside plant facilities and provides mechanized assignment capabilities for those facilities. The LEAD database is created or refreshed by taking an extract from LFACS and loading it into LEAD to create a relational database. Software extracts data from LFACS on a wire center basis and passes the data to LEAD.

2. LEIS Requirements

A significant function of the present invention, or iView, is to provide data to the users (namely LCM and managers) from LEIS databases, LEIM and LEAD. Although LEIM and LEAD are excellent for storing the data, as legacy systems, they are not particularly user-friendly. iView provides the necessary routines and "back office" functionality necessary to provide relevant data in a "point-and-click" user-friendly GUI.

Data Extract

Figure 3:
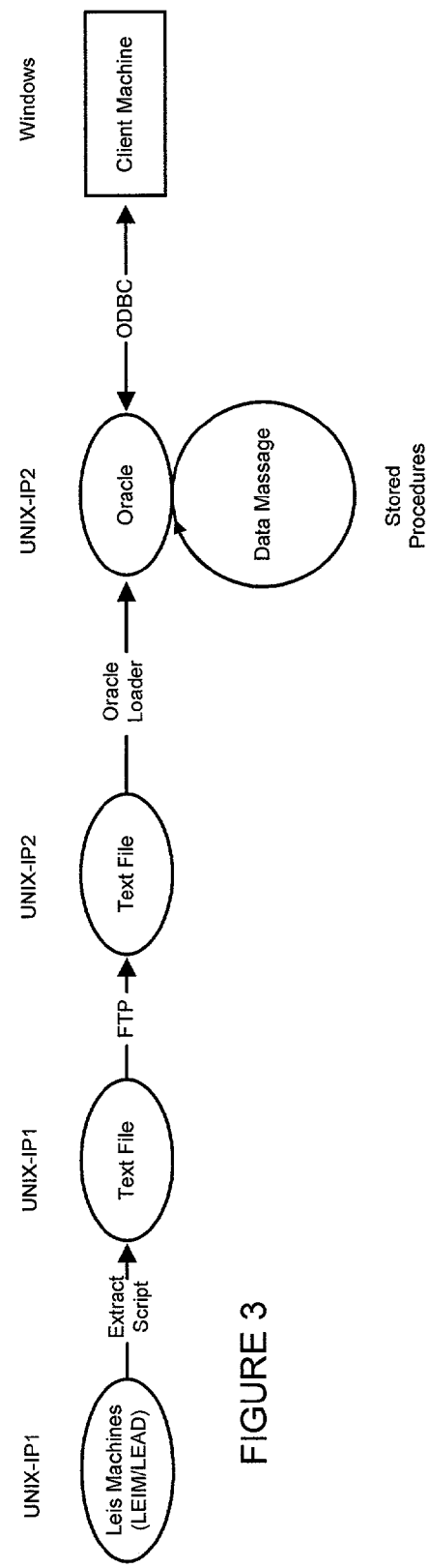
FIG. 3 is a schematic diagram of an exemplary data extraction process in accordance with the present invention.

Referring to FIG. 3, a data extract script is placed in the /apl/local/leim/bin directory on one or more LEIS machines. The script extracts data from nine tables (described below), compresses the data into nine flat files, tars the nine files into one file (i.e., uses the "tape archive" command in UNIX to obtain a desired data format) and then FTPs the data to an Oracle Unix machine, which runs various stored procedures, which are explained in more detail later herein. In a preferred implementation, the script is placed in a cron and run automatically. A client machine, running the Microsoft Windows operating system, accesses the Oracle Unix machine using the well-known Open Database Connectivity (ODBC) protocol. An attachment to this document demonstrates another means of performing this task by connection directly to the LEIS machines.

The tables that data is extracted from comprise: Connection, Equipment, I_Sysconn, Location, Slot, Support_Pair, and System from the LEIM database and Pair and Loop from the LEAD database. Only a few fields of data are selected from the Pair and Loop tables and all fields are selected from the remaining tables. An additional Wire center (wc) field is appended to each record on every table. This Wire center field serves as a major identifier for records in the Oracle database. FIGS. 4-12 depict the tables, variable fields and sizes (according to the LEIS system), and descriptions of each field that is extracted for the purpose of running iView.

3. Interface Specifications

This section describes the interaction from the tables in LEIS and the Oracle database where iView receives its data. Mainly, the interface specifications describe the file(s) of extracted data (size, records, nomenclature, etc.). The first step is to extract the data from the tables shown in FIGS. 4-12. This data is preferably packaged into pipe-delimited ("|") flat files which have the following nomenclature: Iview.wctrcll-i.tablename The flat files are published to a directory on the LEIS machine ("/tmp") where the following steps occur. The flat files are compressed (using: compress filename) and have the following structure: Iview.wctrclli.tablename.Z The compress command automatically adds the .Z extension. After being compressed, they are then "tarred" (tar cvf FileToCompressInto FileThatIsBeingCompressed) and have the following name: iview.wctrclli.tar After being tarred, the tar file is transferred via File Transfer Protocol (FTP) to the Oracle file server (a machine running the UNIX OS). The path that the files are transferred into (on the Oracle UNIX machine) is /bto/appl/fas/iview. Once in the Oracle UNIX environment, steps are taken to unpackage the flat files.

The first step is for the table of contents for the tar file to check for all nine files. Once the check for the files is complete, the tar file untars and then uncompresses. At this point, every file is preferably stored in a directory to load into the Oracle database tables.

The table below shows an exemplary maximum number of records that are loaded into the Oracle database at any given time, based on the assumption that six wire centers worth of data will be loaded consecutively during this process. In an actual implementation of the present invention, the total maximum number of records loaded onto the server at one time is approximately 6,591,960. Of course, this number will change depending on the implementation.

| Table | Total Records |
|---|---|
| Connection | 454,291 |
| Equipment | 6,188 |
| I_Sysconn | 167,614 |
| Location | 636 |
| Loop | 8,257 |
| Pair | 67,093 |
| Slot | 390,280 |
| Support_Pair | 2,511 |
| System | 1,790 |
| Total | 1,098,660 |
| Six cons. | 6,591,960 |
| WC | |

4. Oracle Database Requirements

Business Rules

There are "batches" of updates that preferably occur on the database. In a preferred embodiment all the data is loaded into temp tables, which are replicas of the master LEIM tables. Therefore, nine temp tables (tmp_Tablename) are set up for SQL Loader scripts to load the data into. Once the data is loaded into the temp tables, the following batches of stored procedures preferably occur:

1. Update Cable information in the Slot table (both CO and RT equipment)
2. Update PG Pair information in the Equipment table.
3. Update Test Pair information in the Equipment table.
4. Update ADSL information in the Slot table.
5. Update T1 information in the slot table.
6. Delete the old data for a particular wire center from the master tables and replace it with the updated data from the temp tables and procedures.
7. Remove the data from the temp tables.

Stored procedures are preferably created based on the following business rules. Six extra fields are added to the Location table for update by the stored procedures, namely, availableT1s, activeT1s, muxcap, adslcap, adslavail, and adslwkg.

T1 Update

T1summary information is gathered from the cables, which are appended to the slot table's data. (Md stands for multiplexer derived, thus cable names which begin with md originate at a multiplexer.) To understand the counting method, the following is a brief synopsis of naming conventions and practices.

Figure 13:
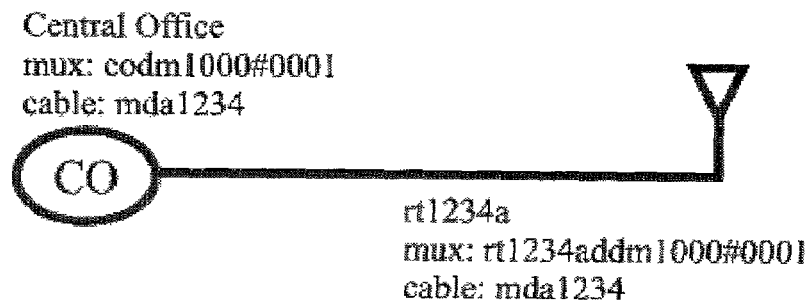
FIGS. 13–15 depict possible deployment configurations of muxes that are accounted for by the present invention.

There are two main configurations for muxes (or muldems) in the field. They can either be asynchronous muxes or SONET muxes. Asynchronous muxes are on a point-to-point topology; for every md cable in the CO, there is only one corresponding md cable at an RT. Therefore, in terms of a naming convention, the CO and RT can share one md cable name. All md cables appear in the connection table. For example, a CO mux is named coddm1000#0001 with md cable mda1234. Based on this naming convention, the RT site where the corresponding mux is has to be rt1234a. The RT mux will be named something like rt1234addm1000#0001 and should have md cable named mda1234 as well. See FIG. 13.

It should be noted that some SONET muxes can be built in as asynchronous muxes on a point-to-point configuration. The same rules apply to these muxes (sharing an md cable name) and should be treated as asynchronous muxes.

Figure 14:
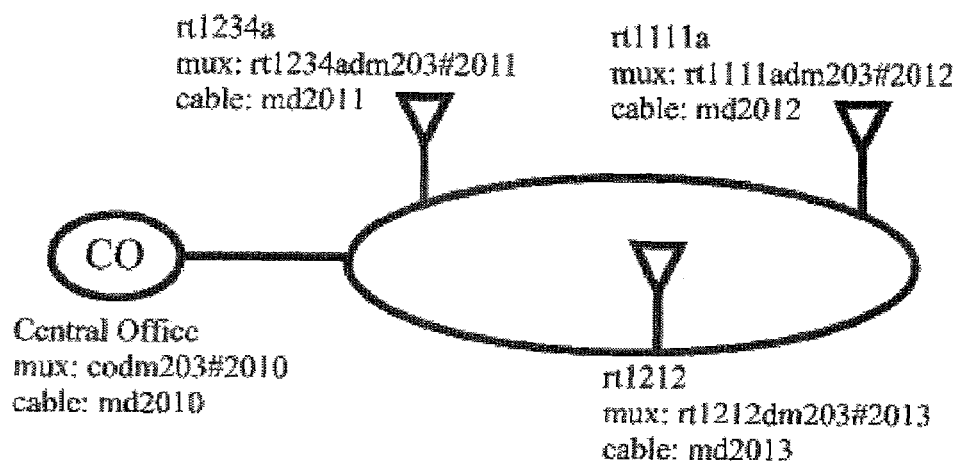

SONET muxes use a ring topology. This means that for every CO mux, there is one or more corresponding RT mux. The md cable name for the CO mux is different from the md cable name of the RTs. Referring to FIG. 14 as an example, a CO mux is named codm203#2010 with md cable md2010. All RT mux cable names have increasing numbers starting with the first one added to the ring. So the first RT mux added to the ring will have a name like rt1234adm203#2011 and should have cable name of md2011. The second mux added to the ring will have a cable name of md2012, and so on. The general similarity between all SONET muxes is that their cable names are same when the last digit is trimmed (md201*). Generally, practice restricts the amount of muxes on a ring to no more than 10.

In addition to the previous example, another scenario must be taken into account. For OC3+ muxes, there is a chance that multiple muxes could reside in the CO on the same ring.
Example: CO mux$_1$: codm203#2010 with md cable: md2010
RT mux: rt1234adm203#2011 with md cable: md2011
CO mux$_2$: codm203#2014 with md cable: md2014

Figure 15:
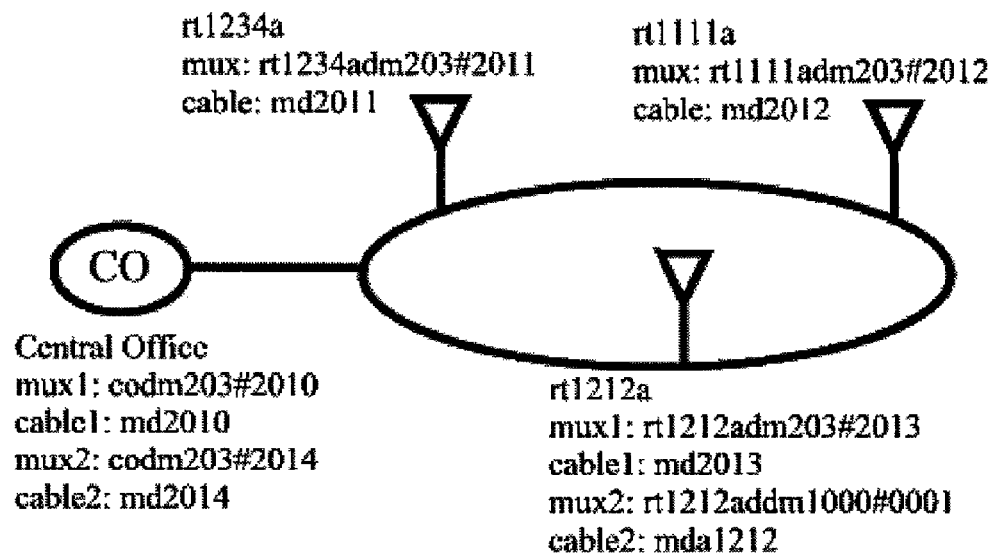

Also, there is a very good chance that multiple muxes reside at one location. Therefore, when calculating md availability, capacity and working, ALL muxes must be taken into account for that site. See FIG. 15.

Noting the previous two examples, in calculating the T1s, the following rules are obtained:

T1 mux capacity is the count of mux ports that have md cables associated with them at a given location (a distinct locid in the location table).

T1s working are the count of how many circuits are currently working at a given location (a distinct locid in the location table). A circuit can exist in LEIM as a System ID or in LEAD as a Circuit ID. If either or both are present on a given port, count it as ONE working T1. For asynchronous muxes, the CO and RT should have the same T1s working (and these circuits should be working on identical ports). For SONET muxes, these numbers may or may not be equal at the CO and RT.

T1s available are obtained differently depending on the type of mux. For asynchronous muxes, this number is the same whether the CO or RT is being calculated. Taking the capacity and subtracting working T1s calculates available T1s. For SONET muxes, the number of available T1s is dependent on the CO mux because an RT mux can only provision:
a. a maximum of T1s the CO is able to provision, or
b. however many circuits are available at the RT—whichever is smaller.

Example: One CO mux with three RT muxes. The CO provisions all 84 T1s to the three RT muxes evenly (28 each). Although each of the RT muxes still have 56 available ports, the CO mux that feeds it is exhausted and therefore the RT mux can not receive anymore service.

It is noted that md cables have both a transmit and receive pair. A T1 is half of the total md cable and pairs for a given md. So, 168 md cable and pairs is the equivalent of 84 T1s (112 md cable and pairs equals 56 T1s).

ADSL Update

ADSL information is calculated from a count on the mr cables for each adsl piece of equipment at a given location. The mr cables can be found in the pair table and on the fromequip side in the connection table (with no equipment in the toequip side). Counting of adsl information is done as follows:

Adsl capacity is a count of pairs for any adsl piece of equipment (has a cable like mr*) for a given location (a distinct locid in the location table).

Adsl working is a count on how many mr cables are being utilized (has a circuit associated with it in the loop table) at a given location (a distinct locid in the location table).

Adsl available is a count of capacity minus working for mr cables at any given location (a distinct locid in the location table).

LEIS Extract Files

Figure 16:
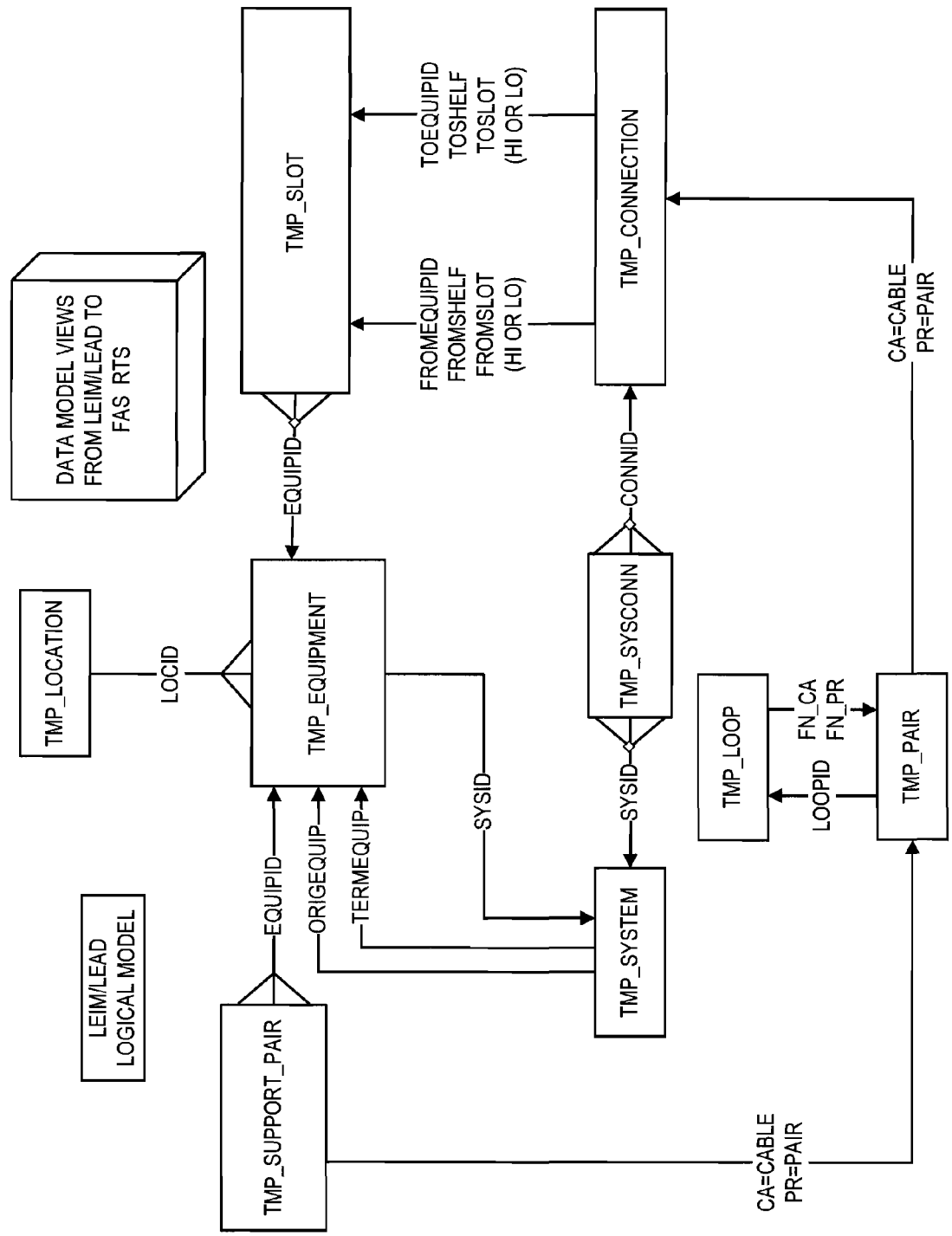
FIG. 16 shows the relationship among the temporary tables that are employed by the present invention.

The LEIS system provides a group of 9 extract files for a wire center when that wire center is refreshed from LFACS on a monthly basis, for example. As already mentioned, these files are preferably "pipe" delimited text files extracted from 9 LEIS tables. Each file is preferably loaded to a temporary table. FIG. 16 shows the relationship among the temporary tables generated. FIGS. 17–25 respectively depict preferred formats for each of the temporary tables. As can be seen, each temporary table has the WC CLLI Code added so that it can be used for multiple wire centers at the same time. The LEIM WC CLLI is used and is derived from the file name.

Figure 26:
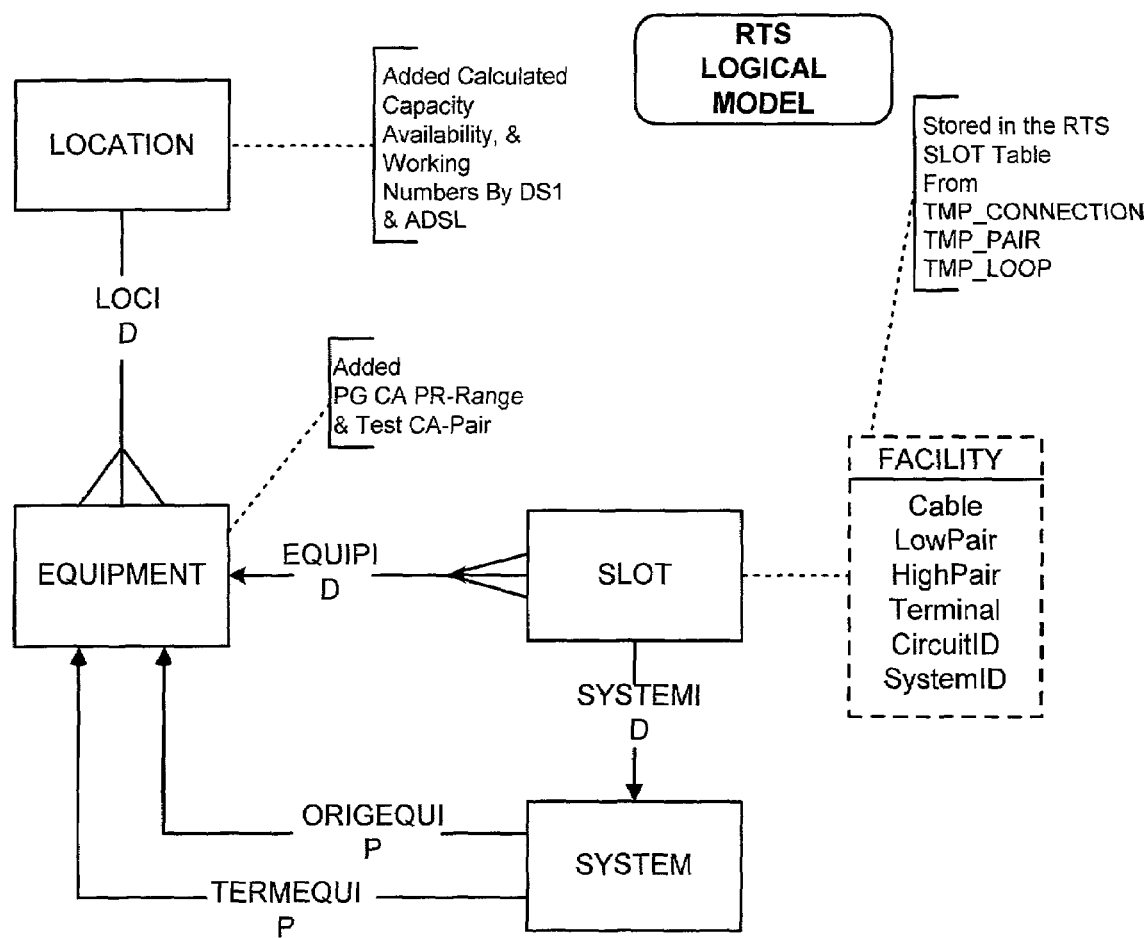
FIG. 26 shows the relationship between another set of tables used to assimilate information from the several temporary tables in accordance with the present invention.

The information stored in the temporary tables of FIGS. 17–25 is subsequently further rearranged into yet another set of tables that are associated with one another in accordance with FIG. 26. The new set of tables is shown if FIGS. 27–31. FIGS. 32–36 illustrate, along with the following description, how each of the tables of FIGS. 27–31 are populated for purposes of the present invention.

Referring first to FIG. 32, most of the desired data is pulled directly from the corresponding temporary table. Additional procedures determine the MUX capacity, DS1 Availability and DS1s working or assigned for each equipment Location, and determine the ADSL capacity, ADSL Availability and ADSLs working or assigned for each equipment Location. The following are preferred logic requirements:
a) The Ship_City_St field in the Location table needs to be updated to 'adsl' for any pieces of equipment that are ADSL.
b) Do not count any slots that have "tadm" in the Function column of the SLOT table. These are special circuits (usually on a muldem that is DS3) and do not count in T1 capacity.
c) Count of ADSL is not done in the Slot table. Based on the model that LEIM uses, there is only one slot for every four circuits (and therefore counting circuits in the slot table is not valid). In other words, a mini-ram has two low speed slots, but eight available circuits for provisioning (capacity).

---

STEP 1:
For each row in the LOCATION table for WC_CLLI being processed:
Set Counters = 0
Select all rows from EQUIPMENT where EQUIPMENT.location_id = LOCATION.location_id
  For each row selected in the EQUIPMENT table:
    Update LOCATION.Ship_City_St to 'adsl' where Equipid like
    '%amr08%', '%amr48%', '%ad096%', '%ad144%', or '%ad192%'
    Select all rows from SLOT where SLOT.equipment_id = EQUIPMENT.equipment_id
    For each row from SLOT selected, count the following:
    If SLOT.cable like "md%"
      Then If SLOT.function <> "tadm"
        Counter_MUXcap = Counter_MUXcap + 1
        If T1Status = 1

-continued

```
            Then Counter_ActiveT1s = Counter_ActiveT1s + 1
          Else
        Else
    Else if SLOT.cable like "mr%"
      Then
        Select all rows in the TMP_CONNECTION table where
          TMP_CONNECTION.cable = SLOT.cable
        For each row from TMP_CONNECTION selected, count the
          following:
          Counter_ADSLcap = Counter_ADSLcap + 1
            If TMP_LOOP.Loop is not null where
              TMP_LOOP.LoopID = TMP_PAIR.LoopID (where
              TMP_PAIR.Cable = CONNECTION.Cable AND
              TMP_PAIR.pair = CONNECTION.pair)
            Then Counter_ADSLwkg = Counter_ADSLwkg + 1
            Else
        Next TMP_CONNECTION
      Else
    Next SLOT
  Next EQUIPMENT
  Set LOCATION.muxcap = Counter_MUXcap
  Set LOCATION.activet1s = Counter_ActiveT1s
  Set LOCATION.availablet1s = muxcap – activet1s
  Set LOCATION.adslcap = Counter_ADSLcap
  Set LOCATION.adslwkg = Counter_ADSLwkg
  Set LOCATION.adslavail = adslcap – adslwkg
Next LOCATION
STEP 2:
Now that values have been recorded for all LOCATION entries in the wire
center, the DS1 Availability has to be checked for SONET rings. The
Availability on the ring may be limited by the Availability in the CO.
If that is the case, the Availability at the RT Locations must be updated
to be that of the CO. To do this, the MUXes on a ring must be identified
and tagged as CO or RT. Then the Availability at the RT Location must be
limited to the Availability at the CO Location. The MD Cable name is
used to determine MUXes on the same ring and the LEIM Equipment ID
is used to determine whether it is a CO or RT MUX. Therefore the
logical process is to:
  Identify all non-CO Locations.
  For each non-CO location determine each Ring
  For each Ring determine its CO counterpart(s) and sum CO
    Availability for a Location
  Then limit Location Availability based on CO sum.
    For each row in the LOCATION table for WC_CLLI being
      processed:
      Set Counters = 0
      Get a list of MUXes (Cable) via join from LOCATION to
      EQUIPMENT based on Location_ID and EQUIPMENT
      to SLOT based on Distinct Equipment_ID and
      Cable where Cable like "md%" and length = 6 and Equipid not
      like "co%".
        For each Cable select list of SLOT rows where SLOT. equipid
        like "co%" and SLOT.cable like (first 5 characters of Cable
        from list) [ex: SLOT.cable like "md201%" would get md2010
        and maybe md2014]
          For each row from SLOT selected, count the following:
          Counter_MUXcap = Counter_MUXcap + 1
            If T1Status = 1
            Then Counter_ActiveT1s = Counter_ActiveT1s + 1
          Next SLOT
        Next Cable
      Counter_Avail = Counter_MUXcap – Counter_ActiveT1s
      If LOCATION.availablet1s is greater than Counter_Avail
      Then set LOCATION.availablet1s = Counter_Avail
Next LOCATION
```

In the foregoing procedure it is assumed that Synchronous MUX rings always have a 6 character cable name in format: aannnnn.

FIG. 33 is populated as shown with the following qualifications:

1. Location_ID from LOCATION where EQUIPMENT.wc_clli=LOCATION.wc_clli and EQUIPMENT.locid=LOCATION.locid.

2. This column is populated only on rows where CATEGORY='RT'.

Logic to populate:
Select CABLE and PAIR from TMP_CONNECTION where TMP_CONNECTION.wc_clli=EQUIPMENT.wc_clli and TMP_CONNECTION.fromequip=EQUIPMENT.equipid and TMP_CONNECTION.cable like "pg %".
This will return multiple rows.
Select the lowest numeric Pair (lopr) and the highest numeric Pair (hipr).
Concatenate into a string=(cable):(space)(lopr)-(hipr) and insert into PGPAIRS.

3. This column is to be populated only on rows where CATEGORY='RT'.

Logic to populate:
Select CABLE and PAIR from TMP_SUPPORT_PAIR where TMP_SUPPORT_PAIR.wc cli=EQUIPMENT.wc_clli and TMP_SUPPORT_PAIR.Equipid=EQUIPMENT. Equipid.
This may return multiple rows. If so select the first Cable and Pair returned.
Concatenate into a string=(cable):(space)(pair) and insert into TESTPAIRS.

FIG. 34 is populated as shown with the following qualifications:

1. Equipment ID from EQUIPMENT where SLOT.wc_clli=EQUIPMENT.wc_clli and SLOT.equipid=EQUIPMENT.equipid.

2. Repeat step two twice—once for FROMEQUIP and once for TOEQUIP

Update SLOT where TMP_CONNECTION.wc_clli=SLOT.wc_clli and TMP_CONNECTION.fromequip=SLOT.equipid and TMP_CONNECTION.fromshelf=SLOT.shelf and TMP_CONNECTION.fromslotlo=SLOT.slot and TMP_CONNECTION.cable like 'm %'
Set SLOT.cable=TMP_CONNECTION.cable, SLOT.lowpair=lowest numeric TMP_CONNECTION.pair, SLOT.hipair=highest numeric TMP_CONNECTION.pair.

Update SLOT where TMP_CONNECTION.wc_clli=SLOT.wc_clli and TMP_CONNECTION.toequip=SLOT.equipid and TMP_CONNECTION.toshelf=SLOT.shelf and TMP_CONNECTION.toslotlo=SLOT.slot and TMP_CONNECTION.cable like 'm %'
Set SLOT.cable=TMP_CONNECTION.cable, SLOT.lowpair=lowest numeric TMP_CONNECTION.pair, SLOT.hipair=highest numeric TMP_CONNECTION.pair.

Note: "md" cables will have 2 pairs for each Slot. Example, MD2020, pairs 1 and 2. This process adds the Cable, Lowpair, and Highpair to the SLOT table from the TMP_ Connection table. The other type of "m %" cable is an "mr" cable for ADSL. These will only have 1 pair.

3. After Cable and Pairs are populated, then load Circuitid and Terminal from TMP_LOOP table.
Join SLOT to TMP_PAIR where SLOT.wc_clli=TMP_PAIR.wc_clli and SLOT.cable=TMP_PAIR.ca and SLOT.lowpair=TMP_PAIR.pr and then join TMP_PAIR to TMP_LOOP where TMP_PAIR.wc_clli=TMP_LOOP.wc_clli and TMP_PAIR.loopid=TMP_LOOP.loopid. Update SLOT.circuitid=TMP_LOOP.loop and
SLOT.terminal=TMP_LOOP.term.
4. SYSTEMID is populated from the TMP_SYSCONN table.
Select CONNID from TMP_CONNECTION where
TMP_CONNECTION.wc_clli=SLOT.wc_clli and
TMP_CONNECTION.fromequip=SLOT.equipid and
TMP_CONNECTION.fromshelf=SLOT.shelf and
TMP_CONNECTION.fromslotlo=SLOT.slot and
TMP_CONNECTION.cable like 'm %'.
Update SLOT.systemid=TMP_SYSCONN.sysid where
TMP_SYSCONN.connid=selected CONNID and
TMP_SYSCONN.wc_clli=SLOT.wc_clli.
The above system information is partially incorrect for DISCS systems. DISCS systems have both an F1 AND F2 system number (at a RT). The system number in the Slot table has already been updated with the F1 system number, and now needs to be updated with the F2 system number so that the information is presented correctly in iView. Another query on the System table must be done to update the Slot table. The logic behind it is that you must retrieve the F2 System based on the Equipid for the F1 system:
Select all SystemIDs from TMP_SYSTEM where TMP_SYSTEM.origEquip=TMP_SYSTEM.termequip.
Update the Slot table with TMP_SYSTEM. SysID where SLOT. SystemID=SYSTEM.SysID
5. After completing the above for a SLOT row, if either CIRCUITID and/or SYSTEMID are populated,
set T1 STATUS=1.

It is assumed in the foregoing that the 'mr' cables are added to the slot table for display, but can not be used for any sort of counting.

5. Graphical User Interface (GUI)

A significant aspect of the present invention is an inventory viewing (iView) tool which provides inventory and capacity information as it pertains to outside plant networks. iView consolidates information found in the LEIM and LEAD databases to provide a single source of information.

The GUI of the present invention preferably comprises five views which are shown in FIGS. 37–41. The naming convention for 4 of the views preferably is V_{wctrclli}_{tablename} where {wctrclli} is the LEIM Wire Center CLLI Code.

IView provides point and click functionality either in a Windows-like environment or through a web browser. Planners are then able to view Central Office or individual Remote Terminal information including:
Location Information:
 a. General (address, Alarm Wiring Figure—AWF, when it was placed, etc.)
 b. Mux Capacity (T1s available, T1s working, total T1s)
 c. ADSL Capacity (available, working, total)
 d. Individual pieces of equipment at the location
Equipment Information (All fields from Equipment table in LEIM)
 a. Equipment IDs
 b. Bay, Unit
 c. SCIDs, TIDs
 d. HECI Codes
Slot Information
Circuit Information
System Information
Color-coded capacity indicators make it easier for a quick view to possible "trouble spots".
For muxes, iView provides easy navigation to other nodes within a ring topology. iView also preferably incorporates pictures of individual Remote Terminals, including casements, cabinets, equipment and cards for equipment. Easy sorting of information is applicable by each of the field names.

Figure 42:
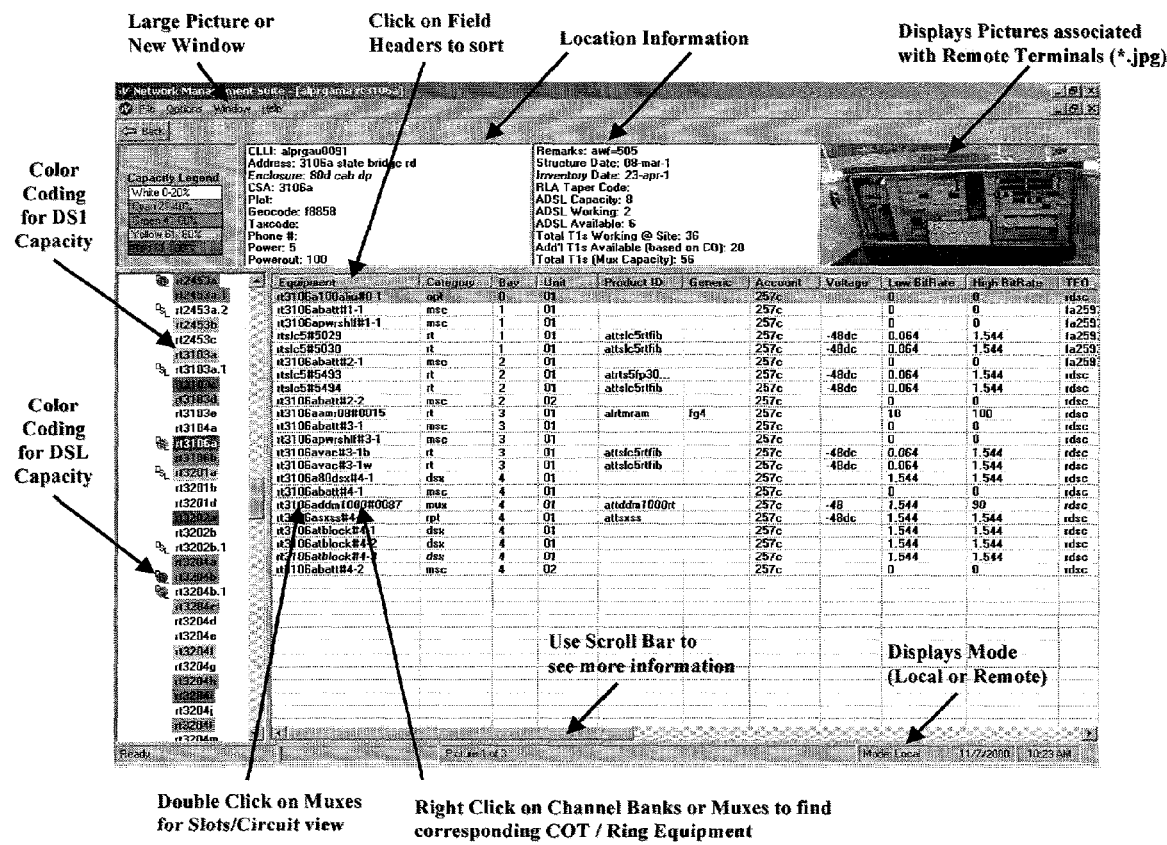
Figure 43:
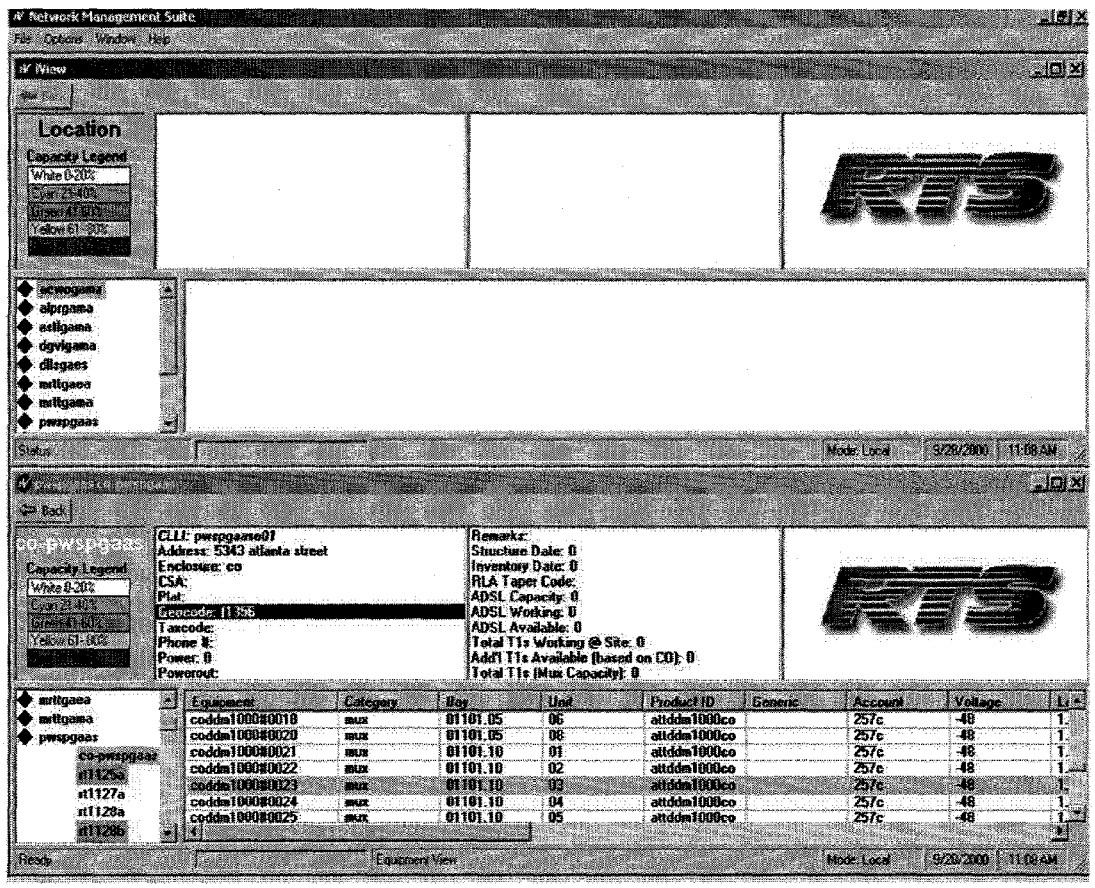

When the program is first opened, a prompt asks the user to select a district (see FIG. 2). This step provides information for setting up the link to the proper databases in a particular district. After selecting a district (or any time iView is opened, thereafter), an initial screen, as shown in FIG. 42, is the graphical user interface (GUI) for iView.
Multiple Screens iView can also be viewed in multiple instances as shown in FIG. 43. If different location information needs to be compared within a wire center—or even different locations in different wire centers—the menu items can be used to cascade the windows. On the menu, the user clicks on the menu item labeled Window, and next clicks on the menu item labeled New Window. Another instance of the iView GUI should open. The two instances of iView will tile according to the menu item chosen. If need be, iView can even be opened with a third (forth, fifth, and so on) instance.
Initial Screen Referring to FIG. 42, when first opening the application, on the left-hand side of the screen, a list of available Wire Centers (WC) in the selected district will be shown. Above that will be a legend for mux capacity information (explained later). To the right, various list boxes are shown which are explained in the following sections.
Location Information The user clicks on one of the RTs. The list boxes at the top and the list box on the right-hand side of the screen fill up with information. For ADSL and T1 information, the program takes a combination of all respective pieces of equipment. The list boxes at the top provide the following information:

General Site Information—Clli, Address, Enclosure, CSA, Plat, Geocode, Taxcode, Phone Number, Power, Powerout, AWF, Structure Date, Inventory Date, Taper Code.

ADSL Information—ADSL capacity (Total amount of ADSL lines which can be provisioned at the site), ADSL working (Total ADSL lines currently working at the site), ADSL available (Total amount of ADSL lines available after calculating the capacity minus the working).

Mux Information-Total T1s working at the site, Additional T1s available (this number is based on how many T1s are available on the CO mux. In a ring topology, you can only have as many T1s as are available at the CO), and the Total T1 Capacity. See FIG. 43.
Equipment Information In the main box in the screen there is a listing of individual pieces of equipment. The following information is available as indicated by the field names on the top of the list box:

Equipment, Category, Bay, (Bay) Unit, Product ID, Generic, Account, Voltage, Low BitRate, High BitRate, TEO, Status, Install Date, Mode, Remarks, SCID, Clei, EWO, Route, Settings, PG Pairs, Test Pairs. See FIG. 44A.

Figures 44A, 44B:
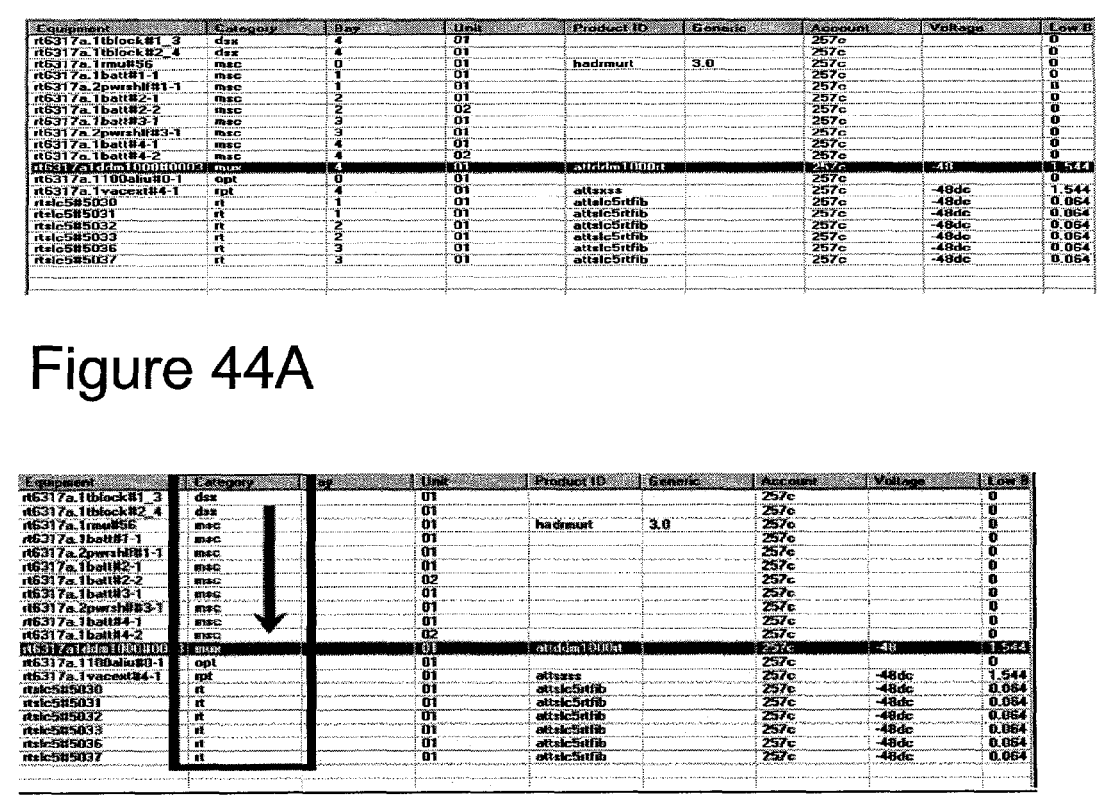

If the user clicks on any one of these field names, the equipment will be sorted in ascending order for that particular field (e.g. click on the "category" field and all the equipment will be sorted in ascending order according to the type of equipment—see FIG. 44B).
Slot Information While the equipment table is open, the slot information for any piece of equipment (if slot information exists) can be viewed by double-clicking on that equipment. For example, by double-clicking on one of the muxes at an RT, information about that particular mux will come up including: Equipment, Port, Card, Function, Cable, LoPair, HiPair, Circuit ID, System ID, Terminal, EWO, Status, Clei, Settings, Resistance, Rate, Max Lines, Frame Space Format, Line Code, Error Rate, Super Slot. Some of this information is in the slot table in LEIM, but other information (like Circuit and System ID) is not. In addition to a graphic view of the slot table, there is information about the circuits and systems working on that mux. FIG. 45 shows this feature of the present invention.

Color Codes

Figure 46:
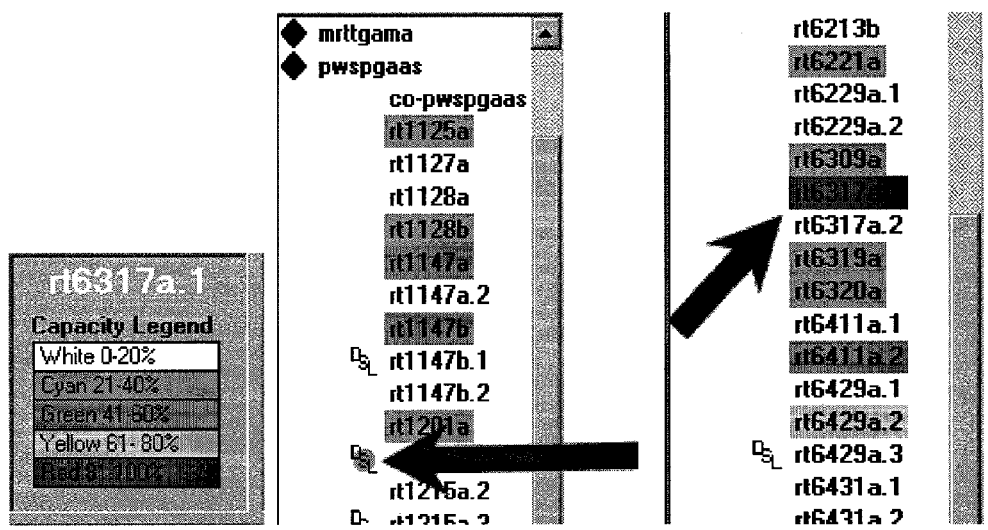

Some of the locations have a colored background and some also have a "DSL" logo to the left with colored backgrounds. This is mux capacity and ADSL information. The legend shown in FIG. 46 explains what each color means, whereby it is possible quickly gauge capacity. For instance, an RT may have a red background. This means 80 to 100 percent of the T1s at that RT are being used and action should be taken to alleviate the problem. The user may also be given the ability to modify the color codes according to his own preference.

Another example may be that there is a "DSL" logo to the left of an RT with a cyan (light blue) background to it. The cyan indicates that anywhere between 21 and 40 percent of the ADSL being used. Essentially, the ADSL equipment is not nearing capacity.

Navigating to Other Muxes

Some added bit of functionality includes a quick navigation to any other mux within the either a point-to-point or ring topology. Right-clicking one of these muxes will bring up a menu listing all other muxes within that network. By highlighting a mux with the mouse and right-clicking on it, iView takes you to that location. FIG. 47 illustrates this feature of the present invention.

Pictures

Another feature provided by iView is the ability to look at actual pictures of a site. These digitized photos have been incorporated into the setup program itself and allows the user to view different attributes about the site. In a preferred embodiment, there are photos of casements, cabinets, and individual pieces of equipment. A picture is loaded into the top right panel of the main screen shown in FIG. 42. In a preferred implementation, it is possible to enlarge the picture for more clear viewing.

6. TIRKS Matching

To uniquely identify a device in TIRKS, the following pieces of data are required from LEIM.

Loc_CLLI: the unique identifier for a location

Bay: the physical location on a 7 foot equipment rack

To uniquely identify a device in LEIM, one data element is required

Equip_ID: unique identifier in for a device

The first step in connecting LEIM data to TIRKS data is to select the SCID, the LOC CLLI, and the Bay from LFACS. In iView, this data is stored in the following manner:

SCID: stored with column name 'filter' in the IV_EQUIPMENT table in lower case

LOC_CLLI: stored with column name 'clli' in the IV_LOCATION table as lower case. This data is found for a device by joining IV_EQUIPMENT to IV_LOCATION using the 'location_id' column BAY: stored as BAY in the IV_EQUIPMENT table as lower case Next, use these three data elements to select the TIRKS data. The data is stored in CBM as follows:

SCID: stored as 'SCID' in the CBM LOW_SIDE table as upper case

LOC_CLLI: stored as 'NODE ' in the CBM_LOW_SIDE table in upper case

BAY: stored as 'EAST_RACK' or 'WEST_RACK' in the CBM_NODES table. Found by joining the CBM_LOW_ SIDE and CBM_NODES tables using SCID and NODE Sample Queries for wire center FTLDFLCY Gather LFACS data:

select a.equipid, a.bay, a.filter, b.clli, c.CIRCUITID, c.shelf, c.CABLE c.LOWPAIR, c.HIGHPAIR, c.SYSTEMID, c.SLOT FROM iv_equipment a, iv_location b, iv_slot c WHERE a.wrtrclli='FTLDFLCY' and a. category='mux' and a. filter is not null and a. LOCATION_ID=b.location_id and a. equipment_id=c. equipment_id and c. circuitid is not null and rownum <=500;

Select data from CBM:

select a.scid, a.node Loc_clli, a.hcode, a.unit, a.cktid, a.act, a.frame, a.bay, a.panel, a.jack, b.EAST_RACK, b.west_rack, b.system, b.facility, b.act from low_side a, nodes b where a.scid in ('NE86CL', 'NE26BL', 'NE26CL') and a.node='FTLDFLCY'

(b.east_rack in ('01141.00A', '01141.00B', '01141.00C', '01141.00D') or b.west_rack in ('01141.00A', '01141.00B', '01141.00C', '01141.00D'))

and b.scid=a.scid and b.node=a.node and a.cktid is not null and rownum <=500;

The following process enters data into TIRKS based on the LFACS data to ensure that the data is consistent LCM determines what equipment to place Hands this requirement for placing equipment to a designer The designer enters the information into LFACS or sends to a LFACS expert to enter into LFACS The output from the process are forms to order plugs, place the device, and to tell the technicians what to connect MEC EIU is then run to feed the data to TIRKS To identify the slots on a MUX add the HCODE (HCCI) to the three data elements

SCID

LOC_CLLI

BAY

HCODE: identifies whether DS1 or DS3

To identify the muldem or Circuit ID, add Unit to the four data elements

SCID

LOC_CLLI

BAY

HCODE

UNIT

There is a need to match equipment data from CBM (source database is TIRKS) with equipment data from LEIM. The problem is that users currently have to log into both TIRKS, LEIM, and LEAD to pull usage information concerning a piece of equipment. Many users avoid using TIRKS, as it is notoriously difficult to use. Furthermore, by providing this data is an easy to use manner, then database clean up is more efficient.

Figure 48:
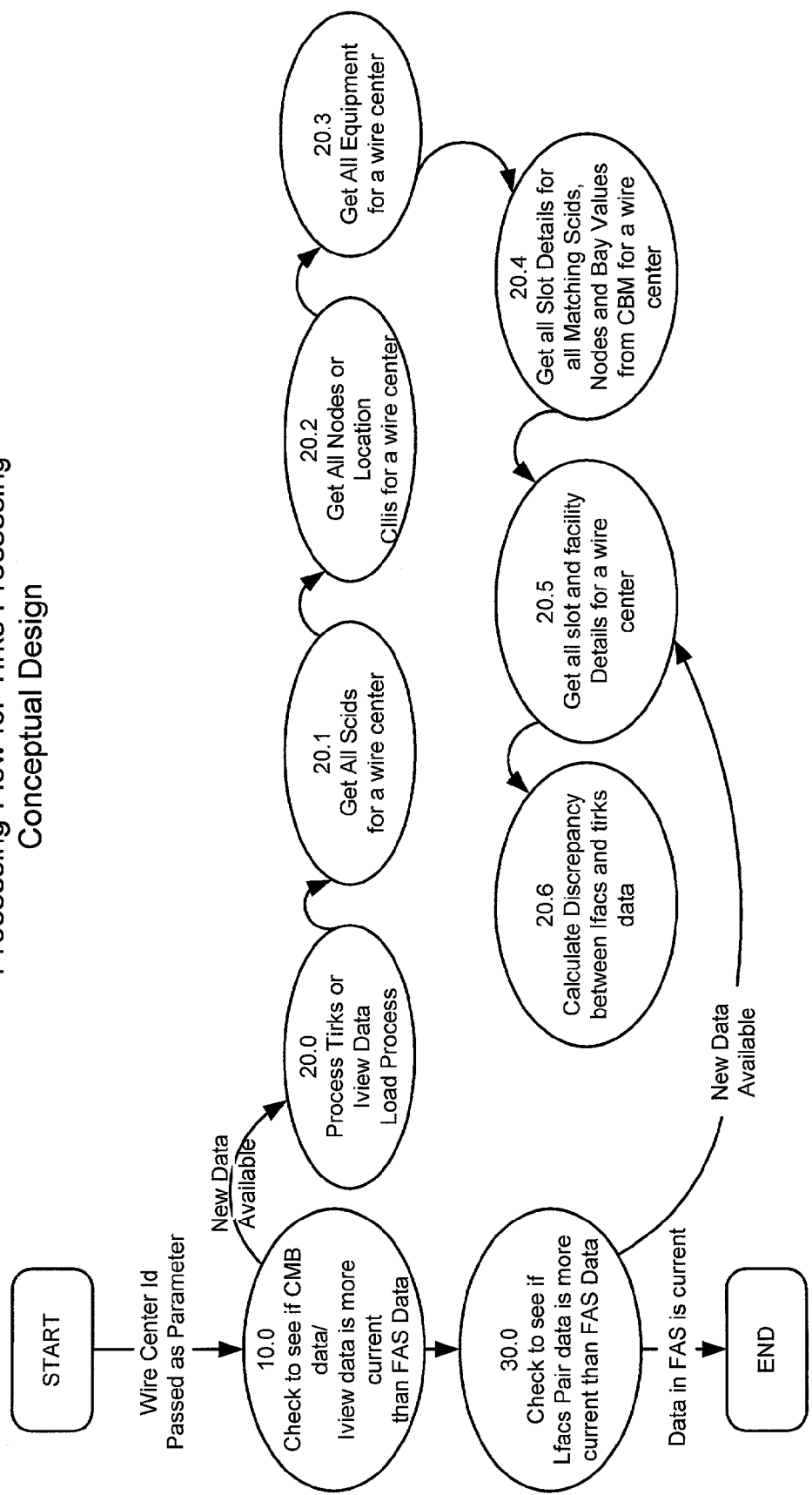
FIG. 48 demonstrates a particular application of TIRKS processing in accordance with the present invention.

First the tool should match the pieces of equipment from each of the two systems. This is done by matching the CLLI (the Common Language Location Identifier as determined by Telcordia) and BAY location for each system. Once the equipment is matched, then the UNITs (in the form of Muldem, slot, port) for each piece of equipment are matched. Circuit information such as circuit identifier and status can then be matched for each database. FIG. 48 demonstrates a particular application of this logic. The SCID (SONET Carrier IDentifier) is not required, but may be employed as desired.

7. Crossbox Matching

Figure 1:
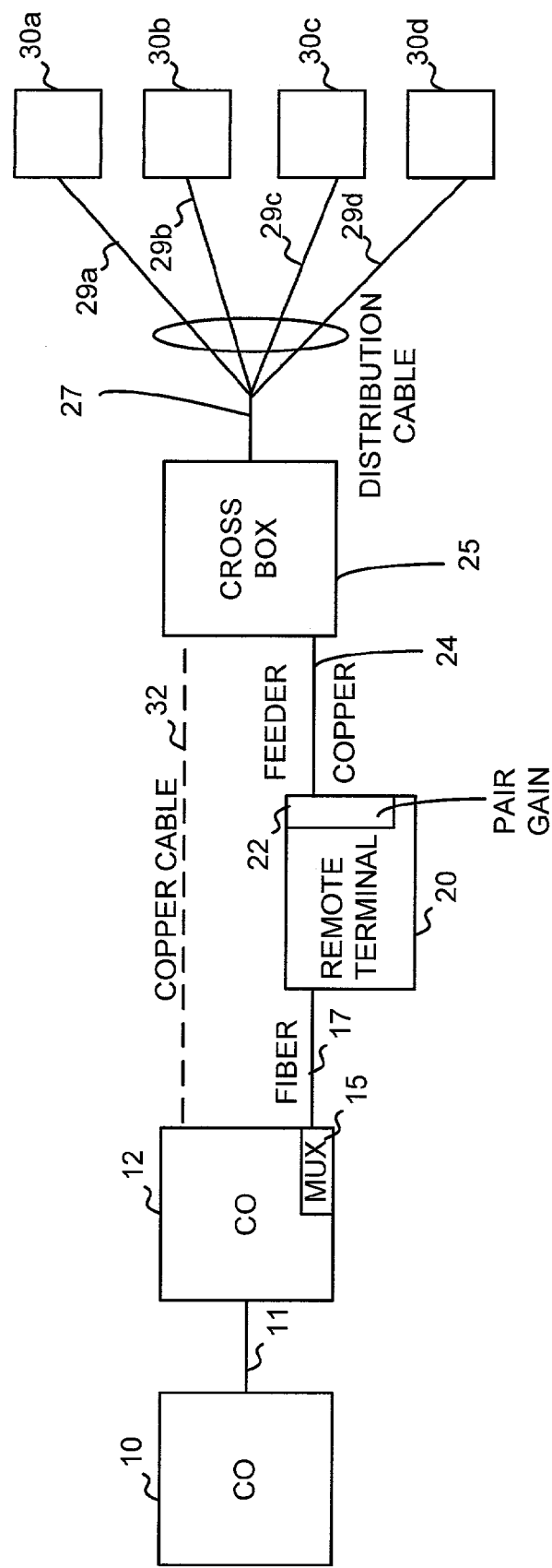
FIG. 1 is a schematic diagram of a conventional telephone network.

One of the most important and difficult devices to monitor is the feeder-distribution interface (FDI) also known as a crossbox. FIG. 1 demonstrates the location of the crossbox in the telephone network. The original crossbox arrangement was such that every "feeder cable" was capable of providing every type of service, or at most, feeder cable was conditioned such that there were two groups of feeder cable, each capable of providing certain types of service. The advent of DLC and its introduction into the telephone network has created a situation where multiple types of feeder cable feed the same crossbox.

As DLC systems have improved over the years, the types of services which can be provided via these systems has been significantly expanded. Whereas the original capacity was 96 POTS (plain old telephone service) lines when served by 4 DS-1's. Today, the capacity is 96 POTS lines or some combination of POTS, coin operated lines, ISDN, or 56 kb (among other services.) The capacity is determined by the types of cards (or plugs) available for that type of DLC system, they number of DS-1's feeding that system, and the means of connecting that system to the switch (universal, integrated TR-08, integrated TR-303.)

As DLC systems have improved to allow more service types, demand from customers for those services has increased. All current reports for a crossbox list the number of pairs which feed that crossbox and the number which are spare. Unfortunately, knowing the number of spare facilities at a crossbox does not tell an LCM what services can be provided and what services need more facilities. This tool provides a matrix as demonstrated in a simple form below:

While the current design calls for extracting data from the LEAD module in LEIS, this tool can be modified to use data from other sources such as TIRKS.

This matrix should exist for every monitoring point in the network, including but not limited to crossboxes, DLC systems, and multiplexers. This tool can also be used for copper and fiber optic cables.

This matrix is typically updated on a monthly basis. As updates are received, previous month's data is stored so trends can be identified. A typical storage plan would call for twenty-four (24) months worth of data plus one month's data from each of the previous three (3) years so that data exists for five (5) years total. (For example, data is created for month 1. As month 2 data is created, month 1 is stored. This continues through month 24. On month 25, data will exist for month 1 and months 3 through 24. On month 37, data will exist for month 1, month 13, and months 14–37.)

Reports can then be created based on either the most current month or based on trends identified from the previous months' data. Scenarios can also be created and studied. One such scenario would allow the user to request a list of crossboxes that would receive a years worth of relief for a particular service type if the number of defects were reduced by 50 percent.

ASIP

There are some customers who have a multiplexer in or very near their building. Other customers are very close (less than 9000 feet) to a central office. This situation allows the phone company to provision DS-1 service for that customer in a shorter time frame than would usually be required for DS-1 service. BellSouth has called this short-interval service ASIP.

There are several steps associated with ASIP:
1) FAS catalogs addresses which qualify for ASIP service.
   On-premises multiplexers are determined through the

|  | Service Type 1 | Service Type 2 | Service Type 3 | Defective | Spare |
|---|---|---|---|---|---|
| Facility Type 1 | a | e | f | g | h |
| Facility Type 2 | b |  |  |  | j |
| Facility Type 3 | c |  |  |  | k |
| Total Working | d |  |  |  |  |
| Number of Circuits Which Can Be Provisioned | m |  |  |  |  |

Facility Type is defined as a group of facilities with like transmission characteristics (capable of supporting the same types of services.) For example, all copper pairs which have no conditioning equipment will be grouped into one facility type. Universal DLC such as SLC96 (manufactured by ATT,) Series 5 (manufactured by Lucent Technologies,) and Fujitsu Digital Loop Carrier will be grouped into a separate facility type.

Service Type is defined as a types of service which require the same transmission characteristics. POTS service would be one service type. Special services such as 9 kb, 16 kb, 56 kb, and 64 kb, have very similar transmission characteristics, so they would be grouped to another Service Type.

Letters a, b, and c in the above figure represent the number of circuits of Service Type 1 which are being served from each of the respective Facility Types. Letter d represents the sum of a, b, and c. Letter m is determined by determining how many services can be provisioned based on the number of spare (h, j, k) for each Facility Type.

following process: muxes are automatically presented to the LCM for validation. The LCM manually enter as the address for those locations which are not served by an on-premises mux. BellSouth refers to this combination of an address and a particular service type (such as DS-1) as a service point.
2) For each service point, FAS confirms that the address information is in an acceptable BellSouth format.
3) The path from the service point to the central office is then determined. In the event of an on-premises multiplexer, this path is simple and automatically determined. In the event of a customer which is not provisioned via an on-premises mux, FAS will present the likely paths to the LCM who will then select the path(s) which should be monitored.
4) For each service point, FAS monitors the path(s) to determine if the number of services available via that path is above a set threshold. If so, then the service point is said to be on-net. If not, then the service point is said to be off-net.

5) An interface is made available to customer service representatives. A customer service representative is able to enter an address and determine if that address is on-net.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of managing telephone network facilities, comprising:
   accessing a first computer having LEIS loaded thereon;
   extracting from LEIS information from a plurality of first tables, the information being in the form of individual records with each record including a field that includes a wire center identifier, wherein the wire center identifier identifies a geographical location of at least one central office which supplies a communications service to a plurality of remote terminals, the records specifying slots per piece of equipment, equipment per location, locations per wire center;
   formatting the extracted information into a pipe-delimited flat file, compressing the flat file, tarring the flat file, and porting the compressed and tarred information of the flat file to a second computer by a file transfer protocol;
   loading, from the second computer, the information of the compressed and tarred flat file into a relational database by untarring and uncompressing the flat file and storing the information from the table such that the information of the relational database is organized according to the wire center identifier of each of the records;
   manipulating the relational database to populate a plurality of second tables with data representative of telephone network facilities where such second tables are organized by wire center;
   displaying at least a portion of the data in the second tables via a graphical user interface, the graphical user interface providing a prompt for a district wherein multiple wire centers exist for each district, and in response to receiving a district, listing the available wire centers for the district, and upon receiving a selection of the available wire centers, accessing the information from the relational database based on the wire centers selected to thereby display for each selected location of the wire center the individual pieces of equipment, the T1 circuits available, the T1 circuits working, the total T1 circuits, the ADSL circuits available, the ADSL circuits working, and the total ADSL circuits, wherein the selected location is displayed against a colored background, the color corresponding to a range comprising a minimum percentage and a maximum percentage of the T1 circuits in use at the location, with the information of each location being displayed in a separate window, and with the windows of the locations being cascaded; and
   providing a matrix of feeder-distribution interface data in the telephone network, the matrix including a plurality of service type fields for identifying different telecommunications services provided in the telephone network, a plurality of facility type fields for identifying facilities having different transmission characteristics, and a spare field for identifying a number of spare circuits for each of the plurality of facility types, wherein the matrix displays a number of circuits for each of a plurality of service types which are being served from each of the plurality of facility types and a number of the different telecommunication services which are capable of being provisioned for each of the plurality of service types based on the number of spare circuits.

2. The method of claim 1, further comprising accessing a plurality of first computers.

3. The method of claim 1, wherein the information extracted from LEIS comprises at least one of connection, equipment, connection, location, loop, pair, slot, support pair, and system information.

4. The method of claim 1, wherein manipulating the relational database comprises determining at least one ADSL capacity and T1 capacity.

5. The method of claim 1, further comprising displaying the data for the selected wire center including displaying information for the location including the geographical address of the location.

6. The method of claim 1, further comprising simultaneously displaying at least two of location information, multiplexer capacity, ADSL capacity, equipment location, slot information, circuit information and system information.

7. The method of claim 6, further comprising simultaneously displaying T1s available, T1s working and total T1s for a selected wire center.

8. The method of claim 6, further comprising simultaneously displaying available ADSL lines, working ADSL lines and total ADSL lines.

9. The method of claim 1, further comprising simultaneously displaying a picture associated with a selected piece of equipment.

10. A method of providing information about telephone network facilities to a loop capacity manager tasked to manage central office and remote terminal components of the telephone network, the method comprising:
    assimilating telephone network facilities data from a plurality of databases, the data being in the form of individual records with each record including a field that includes a wire center identifier, the records specifying slots per piece of equipment, equipment per location, locations per wire center;
    populating a plurality of predefined tables with the data for each of the wire centers;
    further populating the predefined tables with calculated data for each of the wire centers;
    displaying at least a portion of the telephone network facilities data and calculated data in a graphical user interface, the graphical user interface providing a prompt for a district wherein multiple wire centers exist for each district, and in response to receiving a district, listing the available wire centers for the district, and upon receiving a selection of the available wire centers, accessing the information from the relational database based on the wire centers selected to thereby display for each selected location of the wire center the individual pieces of equipment, the T1 circuits available, the T1 circuits working, the total T1 circuits, the ADSL circuits available, the ADSL circuits working, and the total ADSL circuits, wherein the selected location is displayed against a colored background, the color corresponding to a range comprising a minimum percentage and a maximum percentage of the T1 circuits in use at the location with the information of each location being displayed in a separate window, and with the windows of the locations being cascaded; and providing a matrix of feeder-distribution interface data in the telephone network, the matrix including a plurality of service type fields for identifying different telecommunications services provided in the telephone network, a plurality of facility type fields for identifying facilities having different transmission characteristics, and a spare field for identifying a number of spare circuits for each of the plurality of facility types, wherein the matrix displays a number of circuits for each of a plurality of service types which are being served from each of the plurality of facility types and a number of the different telecommunication services which are capable of being provisioned for each of the plurality of service types based on the number of spare circuits.

11. The method of claim 10, wherein the plurality of databases comprise databases from LEIS.

12. The method of claim 10, wherein the predefined tables comprise at least two of location, equipment, slot and system.

13. The method of claim 10, wherein further populating the predefined tables comprises counting a number of ADSL and T1 facilities at a location.

14. The method of claim 10, further comprising simultaneously displaying T1s available, T1s working and total T1s for a selected wire center.

15. The method of claim 10, further comprising simultaneously displaying available ADSL lines, working ADSL lines and total ADSL lines.

16. The method of claim 10, further comprising simultaneously displaying a picture associated with a selected piece of equipment.

17. A method of analyzing the capacity of telephone network facilities, the telephone network comprising a plurality of wire centers each comprising a plurality of internal locations, each location having a plurality of pieces of equipment, and at least one of the pieces of equipment having a plurality of slots, comprising:

identifying first information in a legacy computer system, the legacy computer system storing predetermined data representing telephone network facilities;

extracting the first information from the legacy computer system, the first information being in the form of individual records with each record including a field that includes a wire center identifier, the records specifying, slots per piece of equipment, equipment per location, locations per wire center;

organizing the first information in a predetermined table format while maintaining the identification of the particular wire center for each of the records of the first information in the predetermined table format;

adding second information to the predetermined table format, the second information being based at least in part on the first information;

displaying portions of the first and second information in a modifiable graphical user interface the graphical user interface providing a prompt for a district wherein multiple wire centers exist for each district, and in response to receiving a district, listing the available wire centers for the district, and upon receiving a selection of the available wire centers, accessing the information from the relational database based on the wire centers selected to thereby display for each selected location of the wire center the individual pieces of equipment, the T1 circuits available, the T1 circuits working, the total T1 circuits, the ADSL circuits available, the ADSL circuits working, and the total ADSL circuits, with the information of each location being displayed in a separate window, and with the windows of the locations being cascaded; and providing a matrix of feeder-distribution interface data in the telephone network, the matrix including a plurality of service type fields for identifying different telecommunications services provided in the telephone network, a plurality of facility type fields for identifying facilities having different transmission characteristics, and a spare field for identifying a number of spare circuits for each of the plurality of facility types wherein the matrix displays a number of circuits for each of a plurality of service types which are being served from each of the plurality of facility types and a number of the different telecommunication services which are capable of being provisioned for each of the plurality of service types based on the number of spare circuits.

18. The method of claim 17, wherein the legacy computer system comprises LEIS.

19. The method of claim 17, wherein the first information comprises wire center information, location information for each wire center, equipment information for each location, and slot information for each piece of equipment.

20. The method of claim 17, wherein the second information comprises T1 and ADSL availability.

21. The method of claim 17, wherein the second information comprises T1 and ADSL capacity.

22. The method of claim 17, wherein the second information is generated via an iterative process.

23. The method of claim 17, further comprising simultaneously displaying a picture associated with a selected piece of equipment.

24. A computer system operable to present a graphical user interface for displaying information representative of telephone network facilities, the graphical user interface obtaining data for display from a plurality of first tables populated with information gathered from a plurality of second tables that are populated with data stored in a telephone network facilities system, comprising: a client machine; and a server database in communication with the client machine, wherein the graphical user interface comprises: a first section for listing a plurality of wire centers; a second section for listing a plurality of equipment located within the wire centers; a third section for listing location information associated with a piece of equipment selected in the second section; and a fourth section for displaying a picture of the equipment selected in the second section; wherein the graphical user interface further comprises a prompt for a district wherein multiple wire centers exist for each district, and in response to receiving a district, a list of the available wire centers for the district, and a display for each selected location of the wire center that is selected the individual pieces of equipment, the T1 circuits available, the T1 circuits working, the total T1 circuits, the ADSL circuits available, the ADSL circuits working, and the total ADSL circuits, wherein the selected location is displayed against a colored background, the color corresponding to a range comprising a minimum percentage and a maximum percentage of the T1 circuits in use at the location, with the information of each location being displayed in a separate window, and with the windows of the locations being cascaded, and providing a matrix of feeder-distribution interface data in the telephone network, the matrix including a plurality of service field types for identifying different telecommunications services provided in the telephone network, a plurality of facility type fields for identifying facilities having different transmission characteristics, and a spare field for identifying a number of spare circuits for each of the plurality of facility types, wherein the matrix displays a number of circuits for each of a plurality of service types which are being served from each of the plurality of facility types and a number of the different telecommunication services which are capable of being provisioned for each of the plurality of service types based on the number of spare circuits.

25. The computer system of claim 24, wherein the telephone network facilities system comprises LEIS.

26. The computer system of claim 24, further comprising means for extracting the data from the telephone network facilities system.

27. The computer system of claim 24, wherein a color code is applied to each of the listed wire centers to indicate a capacity level thereof.

28. The computer system of claim 24, wherein the third section lists at least one of ADSL capacity, ADSL working and ADSL availability values.

29. The computer system of claim 24, wherein the third section lists at least one of working T1s, available T1s and total T1s.

* * * * *